(12) United States Patent
Hosek et al.

(10) Patent No.: US 12,441,006 B2
(45) Date of Patent: Oct. 14, 2025

(54) VACUUM-ENVIRONMENT ROBOT WITH INTEGRATED PAYLOAD GRIPPER

(71) Applicant: Persimmon Technologies Corporation, Wakefield, MA (US)

(72) Inventors: Martin Hosek, Salem, NH (US); Sripati Sah, Wakefield, MA (US); Himanshu Shukla, Malden, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 93 days.

(21) Appl. No.: 17/678,180

(22) Filed: Feb. 23, 2022

(65) Prior Publication Data
US 2022/0266456 A1 Aug. 25, 2022

Related U.S. Application Data

(60) Provisional application No. 63/152,979, filed on Feb. 24, 2021.

(51) Int. Cl.
*B25J 15/00* (2006.01)
*B25J 9/16* (2006.01)
*B25J 11/00* (2006.01)
*B25J 19/00* (2006.01)

(52) U.S. Cl.
CPC ......... *B25J 15/0085* (2013.01); *B25J 9/1612* (2013.01); *B25J 19/0041* (2013.01); *B25J 11/0095* (2013.01)

(58) Field of Classification Search
CPC .. B25J 15/0085; B25J 9/1612; B25J 19/0041; B25J 11/0095; B25J 9/042; B25J 15/0052; B25J 19/0045; H01L 21/67766

USPC ......................................................... 361/234
See application file for complete search history.

(56) References Cited

U.S. PATENT DOCUMENTS

| | | | |
|---|---|---|---|
| 6,922,324 B1 * | 7/2005 | Horwitz | H01L 21/6831 361/143 |
| 10,224,232 B2 | 3/2019 | Hosek | |
| 10,269,604 B2 | 4/2019 | Hofmeister et al. | |
| 10,569,430 B2 | 2/2020 | Hosek et al. | |
| 10,596,710 B2 | 3/2020 | Hosek et al. | |
| 10,742,070 B2 | 8/2020 | Hosek et al. | |
| 10,800,050 B2 | 10/2020 | Hosek et al. | |

(Continued)

FOREIGN PATENT DOCUMENTS

WO WO-2016194336 A1 * 12/2016 ............. B25J 15/00

*Primary Examiner* — Sreeya Sreevatsa
(74) *Attorney, Agent, or Firm* — McCarter & English, LLP

(57) ABSTRACT

An apparatus includes a drive; a movable arm connected to the drive and having a first link rotatable about the drive at a first rotary joint, a first actuator configured to cause a rotation of the first link about the first rotary joint, at least one second link connected to the first link at a second rotary joint, at least one second actuator configured to cause a rotation of the second link about the second rotary joint, and at least one gripper on the second link, the gripper being configured to carry a payload. The gripper includes a dielectric substrate, at least one electrode disposed on the dielectric substrate, the electrode being configured to produce an attractive force on a surface of the electrode to attract the payload, and a main electronic module configured to apply a voltage to the electrode from a source of current.

37 Claims, 30 Drawing Sheets

(56) References Cited

U.S. PATENT DOCUMENTS

| | | | |
|---|---|---|---|
| 2004/0027139 A1* | 2/2004 | Pettersson | G01D 5/2412 |
| | | | 324/661 |
| 2011/0193362 A1* | 8/2011 | Prahlad | B25J 15/00 |
| | | | 294/81.2 |
| 2013/0135784 A1* | 5/2013 | Kao | H01L 21/6831 |
| | | | 901/30 |
| 2014/0104744 A1* | 4/2014 | Prahlad | B25J 15/0085 |
| | | | 361/234 |
| 2014/0133062 A1* | 5/2014 | Prahlad | H02N 13/00 |
| | | | 361/234 |
| 2015/0022935 A1* | 1/2015 | Cox | H01L 21/67742 |
| | | | 361/234 |
| 2018/0108552 A1 | 4/2018 | Hofmeister et al. | |
| 2020/0262660 A1 | 8/2020 | Hosek et al. | |
| 2020/0346347 A1* | 11/2020 | Sankai | B25J 13/082 |
| 2021/0245372 A1 | 8/2021 | Hosek et al. | |

* cited by examiner

VACUUM-ENVIRONMENT ROBOT WITH INTEGRATED PAYLOAD GRIPPER

CROSS REFERENCE TO RELATED APPLICATION

This application claims priority under 35 USC 119(e) to U.S. Provisional Application No. 63/152,979, filed Feb. 24, 2021, the content of which is hereby incorporated by reference in its entirety.

BACKGROUND

Technical Field

The example and non-limiting embodiments relate generally to a material-handling robot for use in a vacuum environment and, more particularly, to a material-handling robot for use in a vacuum environment, the robot having an integrated electrically-operated payload gripping system.

Brief Description of Prior Developments

Material-handling vacuum-environment robots utilized in semiconductor wafer processing systems typically hold a payload, such as a semiconductor wafer, on the robot's end-effector passively by the means of frictional forces between the payload and the end-effector. The available frictional forces limit the acceleration of the end-effector to below the levels where slippage of the payload on the end-effector occurs and, therefore, results in longer-than-desirable duration of material-handling operations, which in turn impacts the productivity, for example, the number of wafers processed per hour, of the semiconductor wafer processing system. Active payload gripping is not used in these types of applications because of (a) the difficulties with supporting active components in the vacuum environment, including vacuum compatibility, power delivery, communication signals, and heat removal, and (b) the risk of payload contamination by particulate matter produced due to contact and relative motion of moving mechanical components.

SUMMARY

In accordance with one aspect, an apparatus comprises a drive; a movable arm connected to the drive, the movable arm comprising a first link rotatable about the drive at a first rotary joint, a first actuator configured to cause a rotation of the at least one first link about the first rotary joint, at least one second link connected to the first link at a second rotary joint, at least one second actuator configured to cause a rotation of the at least one second link about the second rotary joint, and at least one gripper on the at least one second link, the at least one gripper being configured to carry a payload. The at least one gripper comprises a dielectric substrate, at least one electrode disposed on the dielectric substrate, the at least one electrode being configured to produce an attractive force on a surface of the electrode to attract the payload, and a main electronic module configured to apply a voltage to the at least one electrode from a source of current.

In accordance with another aspect, a method comprises providing a drive; providing a movable arm connected to the drive, the movable arm comprising a first link rotatable about the drive at a first rotary joint, a first actuator configured to cause a rotation of the at least one first link about the first rotary joint, at least one second link connected to the first link at a second rotary joint, at least one second actuator configured to cause a rotation of the at least one second link about the second rotary joint, and at least one gripper on the at least one second link, the at least one gripper comprising a dielectric substrate and at least one electrode disposed on the dielectric substrate; and applying a voltage to the at least one electrode, from a source of current, to produce an attractive force on the surface of the electrode to cause an attractive force between the at least one electrode and a payload adjacent to the electrode and to be carried by the at least one gripper.

In accordance with another aspect, an apparatus comprises at least one processor; and at least one non-transitory memory including computer program code, the at least one memory and the computer program code configured to, with the at least one processor, cause the apparatus at least to perform applying a voltage to at least one electrode, from a source of current, to produce an attractive force on a surface of the electrode to cause an attraction between the at least one electrode and a surface of a payload adjacent to the electrode. The payload is configured to be carried by at least one gripper.

In accordance with another aspect, a method of using a robot to transport a payload comprises applying a voltage, from a source of current, to an electrode located on a gripper, the gripper being located on a robot end-effector, wherein applying the voltage causes a first distribution of charges on the electrode; placing the payload on the electrode; causing a second distribution of charges on the payload, wherein the charges on the payload are opposite in polarity to the charges on the electrode; attracting the payload to the gripper; and causing the robot end-effector to transport the payload.

BRIEF DESCRIPTION OF THE DRAWINGS

The foregoing aspects and other features are explained in the following description, taken in connection with the accompanying drawings, wherein.

DETAILED DESCRIPTION

Figure 1:
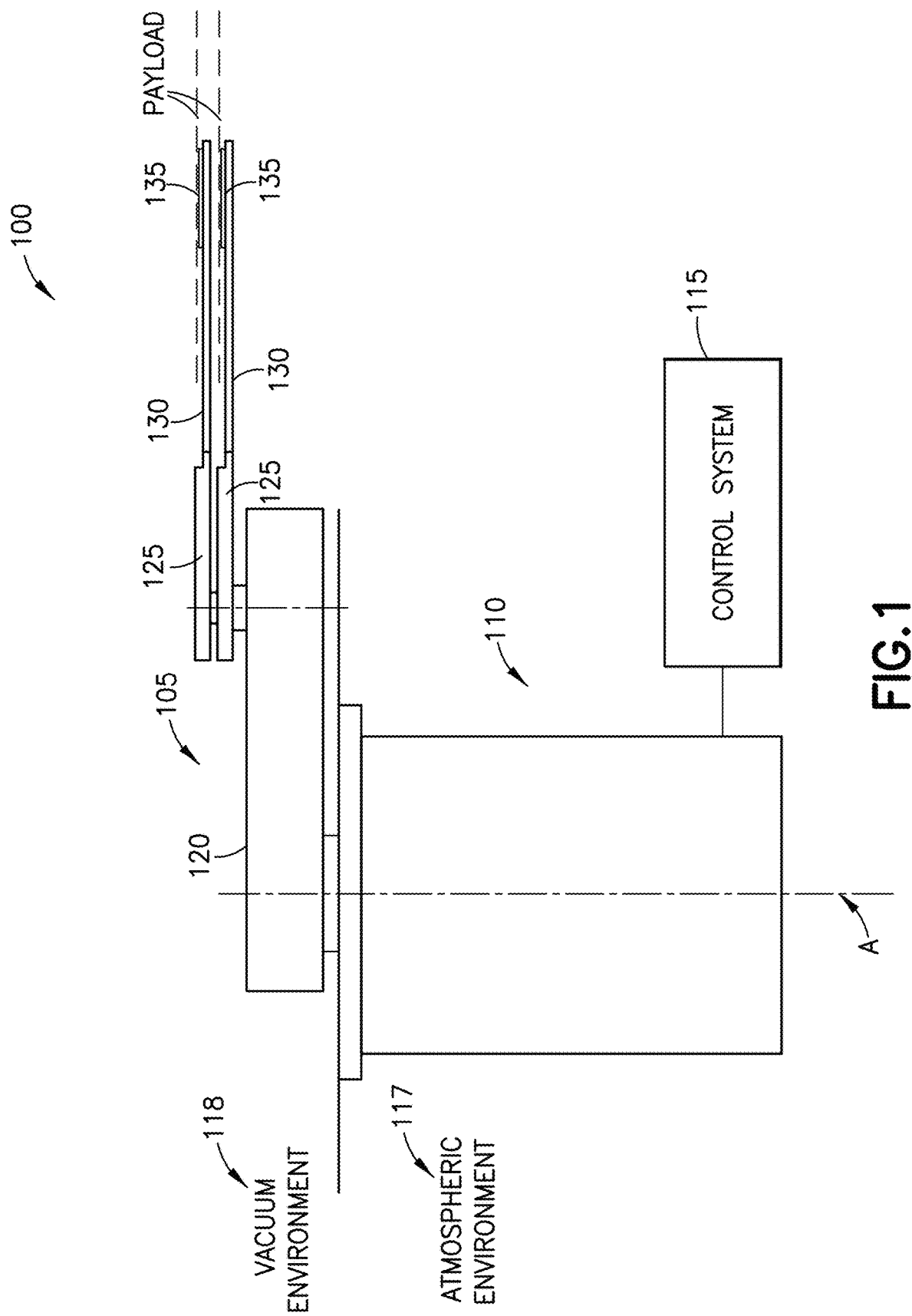
FIG. 1 is a schematic view of one example of a material-handling robot for use in a vacuum environment.

Although the features will be described with reference to the example embodiments shown in the drawings, it should be understood that features can be embodied in many alternate forms of embodiments. In addition, any suitable size, shape, or type of elements or materials could be used.

Disclosed herein are example embodiments of vacuum-environment robots having vacuum-compatible grippers or gripping systems that hold payloads on respective robot end-effectors with desirably high holding forces, thus allowing for higher accelerations of the end-effectors, reducing the durations of material handling operations, and increasing productivity of the semiconductor wafer processing systems serviced by the robots. Such robots are also capable of achieving desirably high payload holding forces without increasing the risks of payload contamination by particulate matter that may be produced due to mechanical contact and relative motion.

Referring now to FIG. 1, a simplified schematic view of an example material-handling vacuum-environment robot according to the present invention is shown generally at 100 and is hereinafter referred to as "robot 100." The example robot 100 may comprise a robot arm 105, a drive unit 110, and a control system 115. The drive unit 110 may be located in an atmospheric environment 117, and the robot arm 105 may be located in a vacuum environment 118 and rotatable on a drive axis A extending through the drive unit 110 and through a barrier separating the atmospheric environment 117 and the vacuum environment 118. The robot arm 105 may comprise an upper arm 120 and one or more forearms 125. In the particular example of FIG. 1, two forearms 125 are shown. Each of the forearms 125 may carry an end-effector 130 with a "chuck" or payload gripper 135 configured to accept a payload. In any example as disclosed herein, the gripper may be on or embedded into (for example, integral with) the forearm. Examples of payloads that may be accepted by the payload gripper 135 include, but are not limited to, semiconductor wafers.

Figure 2A:
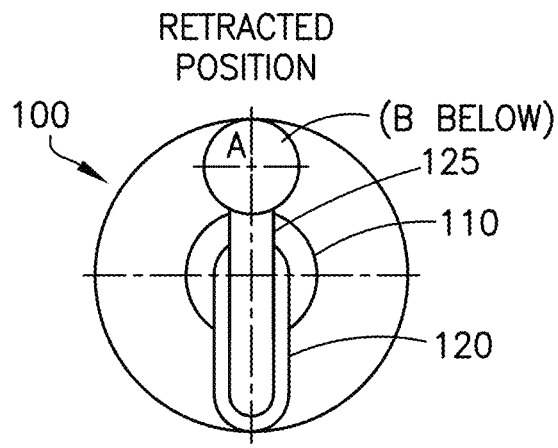
FIG. 2A is a diagrammatic top view of the robot of FIG. 1 showing the robot in a retracted position.
Figure 2B:
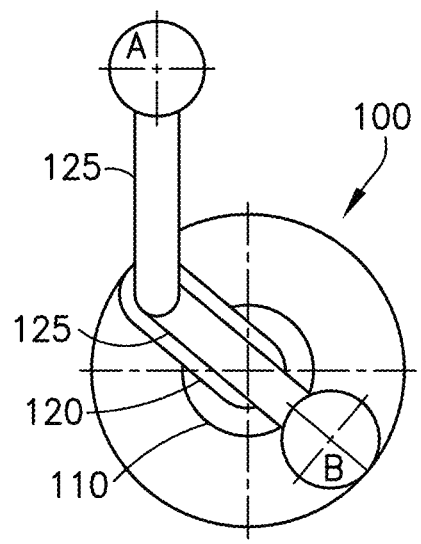
FIGS. 2B through 2D are diagrammatic top views of the robot of FIG. 1 showing an upper of two forearms of the robot arm extended at various angles.
Figure 2C:
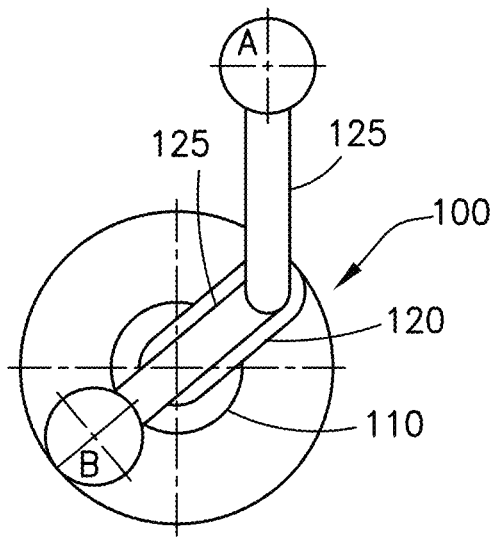
Figure 2D:
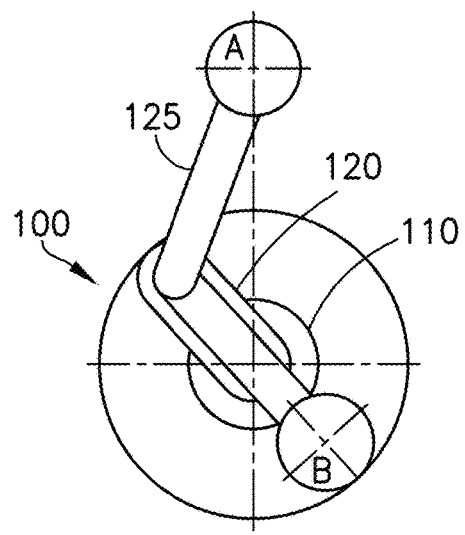
Figure 2E:
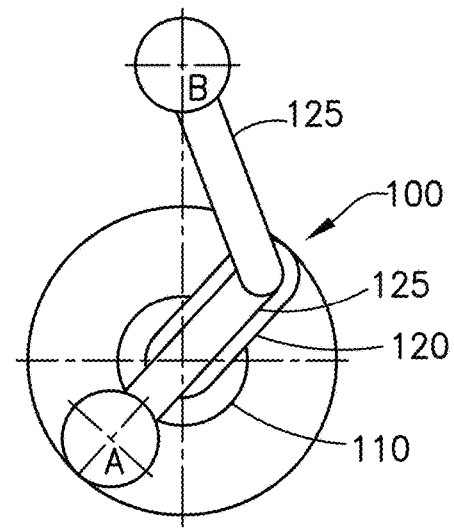
FIGS. 2E through 2G are diagrammatic top views of the robot of FIG. 1 showing a lower of two forearms of the robot extended at various angles.
Figure 2F:
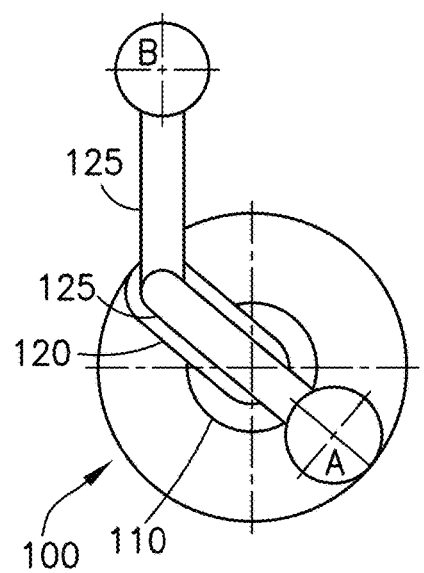
Figure 2G:
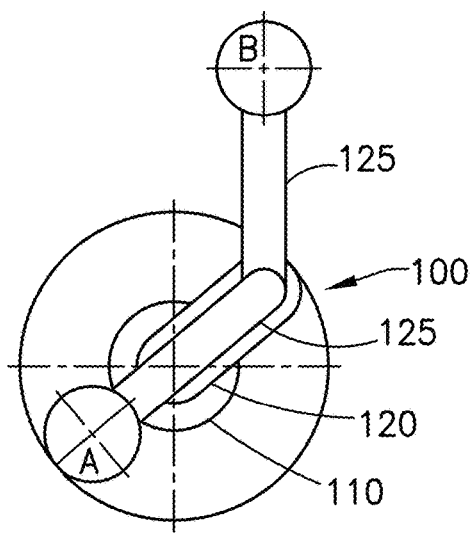

Referring now to FIGS. 2A through 2G, operation of the robot 100 is shown. FIG. 2A illustrates the robot 100 in a retracted position in which the forearms 125 are positioned over the upper arm 120. FIGS. 2B and 2C illustrate the robot 100 in positions in which an upper of the forearms 125 is rotated at 135 degree angles from a lower of the forearms 125. FIG. 2D illustrates the robot 100 in a position in which the upper of the forearms 125 is rotated at less than a 135 degree angle from the lower of the forearms 125. FIG. 2E illustrates the robot 100 in a position in which the lower of the forearms 125 is rotated at less than a 135 degree angle from the upper of the forearms 125. FIGS. 2F and 2G illustrate the robot 100 in positions in which the lower of the forearms 125 is rotated at 135 degree angles from the upper of the forearms 125.

Figure 3:
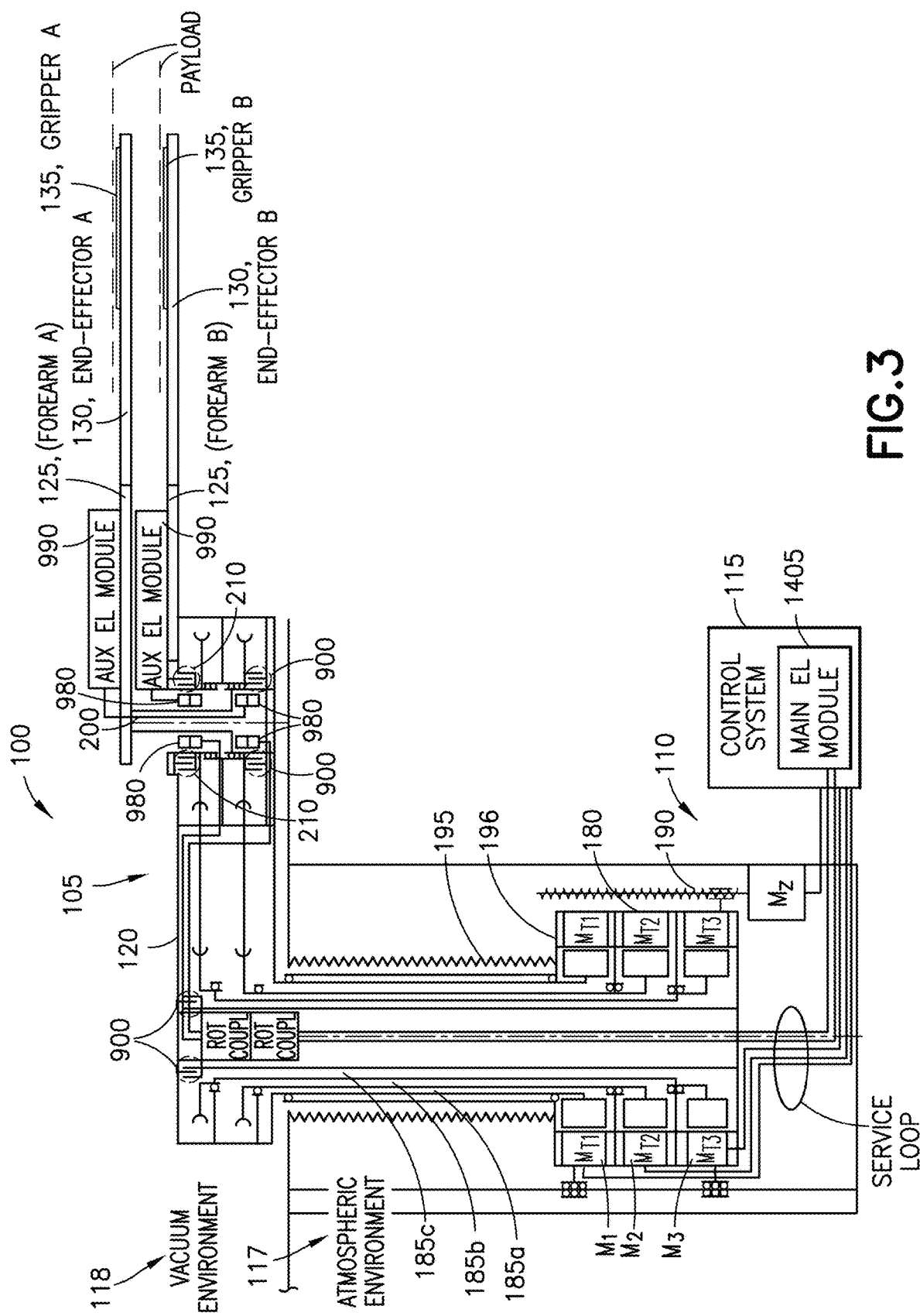
FIG. 3 is a schematic cross-sectional view showing internal arrangements of the robot of FIG. 1.

Referring now to FIG. 3, examples of various components and their internal arrangements in the robot 100 are shown. The drive unit 110 of the robot 100 may include a spindle assembly 180 having one or more drive shafts. In the drive unit 110, three drive shafts 185a, 185b, and 185c are coaxially arranged (drive shaft 185c being the innermost drive shaft and drive shaft 185a being the outermost drive shaft) and actuated by motors M1, M2, and M3, respectively. The drive unit 110 may further include an optional vertical lift (Z-axis) mechanism 190, which may be configured to move the spindle assembly 180 up and down (along the Z-axis). The spindle assembly 180 may be movable using, for example, a ball-screw and motor Mz.

The drive unit 110 of the robot 100 may further include a bellows 195 and a cylindrical barrier between stators and rotors of the motors M1, M2, and M3 to contain the vacuum environment 118 in which the robot arm 105 operates. The bellows 195 may be configured to accommodate the up and down motion of the spindle assembly 180. Alternatively, the robot 100 may be configured such that no barrier is present between the stators and rotors of the motors M1, M2, and M3, and the stators of the motors M1, M2, and M3 may be located in the vacuum environment 118. Each of the motors M1, M2, and M3, as well as Mz, may incorporate a position measurement system, such as a position encoder.

The upper arm 120 of the robot arm 105 may be connected to the outermost drive shaft 185a and the one or more forearms 125, which may be coupled to the upper arm 120 via coaxial rotary joints 200 (referred to as elbow joints). In the example of FIG. 3, two forearms 125 are shown. The upper forearm 125 (designated as forearm A) may be actuated by the middle drive shaft 185b of the drive unit 110 via a first transmission arrangement. As an example, the first transmission arrangement may include a pulley attached to the middle drive shaft 185b of the drive unit 110, a pulley attached to forearm A, and a belt, band, or cable between the two pulleys. Similarly, the lower forearm 125 (designated as forearm B) may be actuated by the inner drive shaft 185c of the drive unit 110 via a second transmission arrangement. As an example, the second transmission arrangement may include a pulley attached to the inner drive shaft 185c of the drive unit 110, a pulley attached to forearm B, and a belt, band, or cable between the two pulleys. Each of the forearms 125 may carry a respective end-effector 130 with a respective payload gripper 135 configured to accept a payload, such as a semiconductor wafer. For example, forearm A may carry the end-effector A having gripper A, and forearm B may carry the end-effector B having gripper B.

Optionally, and still referring to FIG. 3, one or more of the coaxial rotary joints 200 of the robot arm 105 may be complemented by one or more thermal coupling arrangements 210 configured to transfer heat across the coaxial rotary joints 200. The optional thermal coupling arrangements 210 may be utilized to improve heat removal from any heat-producing components associated with the payload grippers 135.

To control the motion of the robot 100, encoder signals and motor lines associated with motors M1, M2, M3, and Mz may link to a main electronic module 1405 of the control system 115. The control system 115 (and the main electronic module 1405) may be located in the drive unit 110 or, as shown schematically in FIG. 3, external to a housing of the drive unit 110.

The main electronic module 1405 may receive external inputs, for example, from the user or a host system, read positions of individual motion axes (motors M1, M2, M3, and Mz) from position encoders, and process information to apply voltages to the motors M1, M2, M3, and Mz to perform the desired motion of the robot 100 and/or to achieve the desired positions of the robot arm 105.

Figure 4:
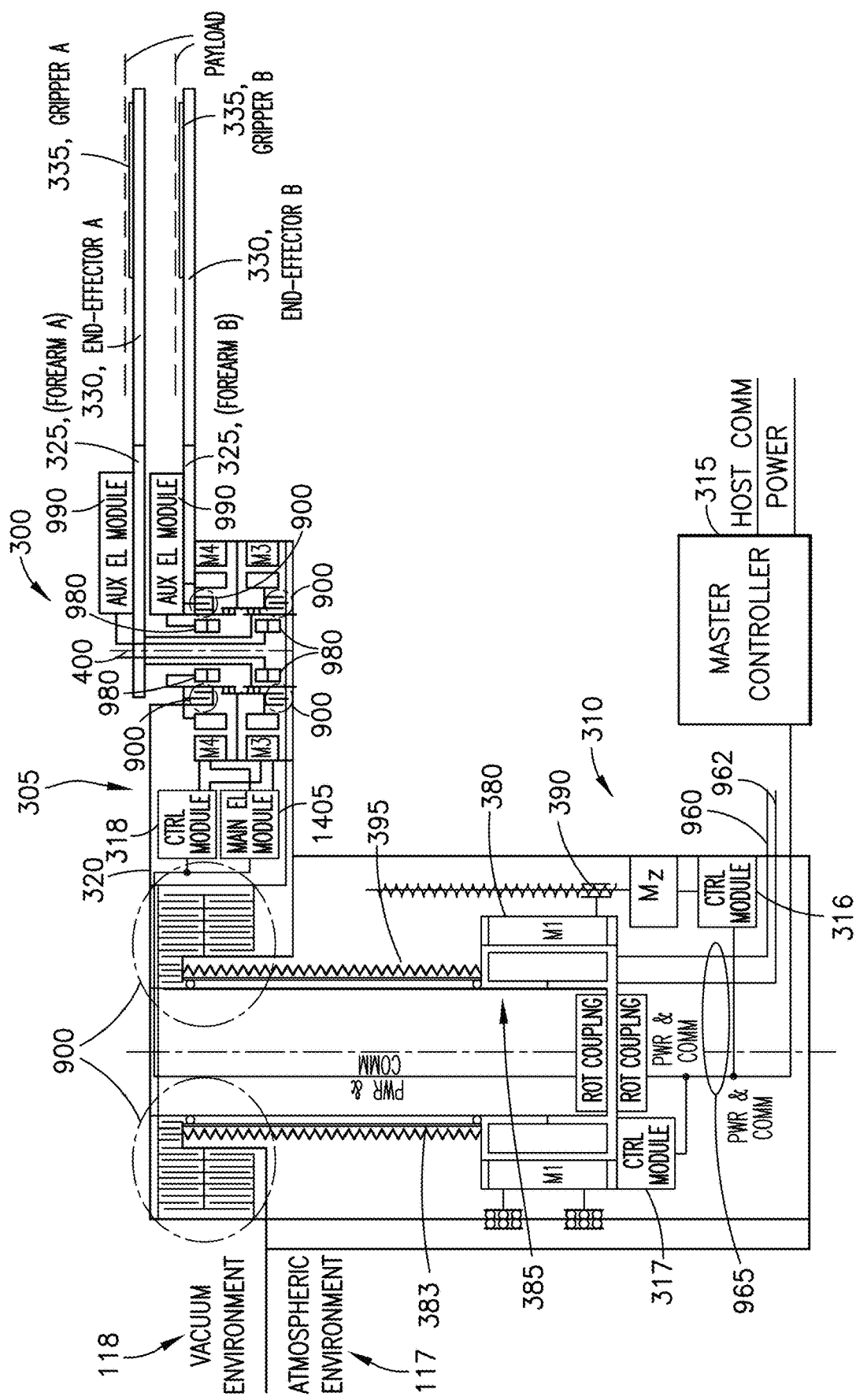
FIG. 4 is a schematic cross-sectional view showing alternative internal arrangements of a robot having distributed actuators.

Referring now to FIG. 4, alternative internal arrangements applicable to the example robot 100 are shown with regard to an example "robot 300." The example robot 300 may comprise an architecture with distributed actuators. A robot arm 305 may comprise an upper arm 320 (located in the vacuum environment 118) connected to a drive unit 310 at a shoulder joint. One or more forearms 325 may be coupled to the upper arm 320 via coaxial rotary joints 400 (referred to as elbow joints). In the particular example of FIG. 4, two forearms 325 are shown. The upper arm 320 may house one or more actuators (motors), each coupled to one of the forearms 325. As with the example robot 100 above, each of the forearms 325 may carry an end-effector 330 with a payload gripper 335 configured to accept a payload. Examples of payloads that may be accepted by the payload gripper 335 include, but are not limited to, semiconductor wafers.

The drive unit 310 of the robot 300 may include a spindle assembly 380 with a drive shaft 385 and an optional vertical lift (Z-axis) mechanism 390. The Z-axis mechanism 390 may be configured to move the spindle assembly 380 up and down, for example, via a ball-screw, using motor Mz. The drive shaft 385 may be connected to the upper arm 320 at the shoulder joint and may be actuated by the motor M1.

The drive unit 310 of the robot 300 may comprise a bellows 395 and a cylindrical barrier between the stator(s) and the rotor(s) of motor M1, similar to the example robot 100 of FIG. 3, to contain the vacuum environment 118 which may be present in the space where the robot arm 305 operates. The bellows 395 may be configured to accommodate up and down motion of the spindle assembly 380 of the robot 300. Alternatively, no barrier between the stator and rotor of motor M1 may be used, and the stator of motor M1 may be located in the vacuum environment 118.

A control system of the robot 300 may comprise a master controller 315, one or more control modules 316 located in a stationary manner in the drive unit 310, one or more control modules 317 attached to the spindle assembly 380, and one or more control modules 318 located in the robot arm 305. The master controller 315 and the control modules 316, 317, and 318 may be connected by a communication network.

In the example robot 300, the actuators (motors M2 and M3) associated with the elbow joints of the robot arm 305 may be controlled by the control module 318 located in close proximity to the motors within the upper arm 320.

The actuator (motor M1) located in the spindle assembly 380 of the drive unit 310, may be controlled by the control module 317 attached to the spindle assembly 380, which may move up and down with the spindle assembly 380. The Z-motor (Mz) may be controlled by the stationary control module 316 located, for example, at the base of the drive unit 310.

The control system via the master controller 315 may receive external inputs, for example, from the user or a host system, read positions of individual motion axes (motors) from position encoders (not shown for simplicity), and process the information to apply voltages to the motors to perform the desired motion and/or achieve the desired position.

In the example robot 300, the upper arm 320 may be located in and be subject to the vacuum environment 118. The internal volume of the upper arm 320 may be sealed from the vacuum environment 118 and filled with air, another mix of gases or a single gas, for example, nitrogen. As indicated in FIG. 4, the internal volume of the upper arm 320 may further include an upper end of the drive shaft 385 extended thereinto, and the drive shaft 385 may be sealed at the lower end, forming a sealed cavity that can house electromechanical components and allow for their connectivity in a gaseous environment (as opposed to vacuum). As an example, the sealed cavity may house the control module 317 and a portion of a rotary coupling module.

As indicated in FIG. 4, the sealed cavity may also house the stators of motors M3 and M4, in which case a cylindrical barrier between the stators and rotors of the motors M3 and M4 may be utilized to separate the internal volume of the upper arm 320 from the external vacuum environment 118. Alternatively, the stators of motors M3 and M4 may be located in the vacuum environment 118 and an electrical feedthrough may be used to connect them with the control module 318 located inside the sealed cavity.

Referring still to FIG. 4, motors M3 and M4 as well as the control module 318 may be heat-sunk to the upper arm 320. In this arrangement, heat produced by motors M3 and M4 as well as the control module 318 may be transferred into the upper arm 320, conducted to the drive shaft 385, and radiated to a neck 383 of the spindle assembly 380 and conducted to the housing of the spindle assembly 380.

Figure 5:
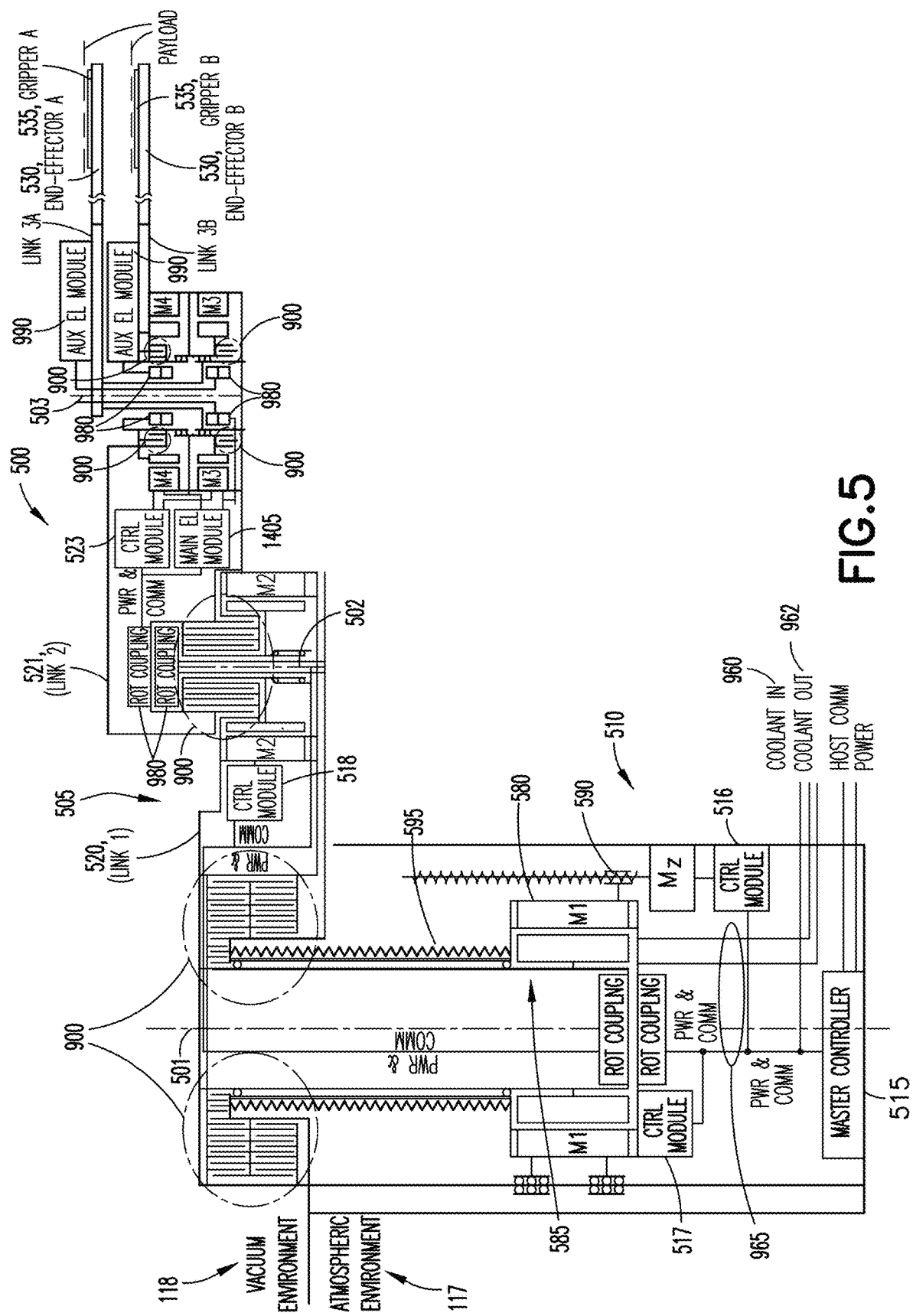
FIG. 5 is a schematic cross-sectional view of another example of a material-handling robot for use in a vacuum environment.

Referring now to FIG. 5, another example of a vacuum-compatible material-handling robot (and its internal structures) is shown and is referred to as "robot 500." Robot 500 is similar to other example robots disclosed herein. The example robot 500 may comprise a robot arm 505, a drive unit 510, and a control system or controller 515, which may be internal to the drive unit 510. The drive unit 510 may comprise a spindle assembly 580 and one or more drive shafts, such as three drive shafts arranged coaxially, each being actuated by a respective motor. An optional vertical lift (Z-axis) mechanism 590 may be included to move the spindle assembly 580 up and down. The Z-axis mechanism 590 may be configured to move the spindle assembly 580 up and down, for example, via a ball-screw, using motor Mz. The spindle assembly 580 may comprise a drive shaft 585 connected to an upper arm 520 and actuated by motor M1.

The robot arm 505 may include two links arranged in series and coupled to each other via a rotary joint 502, and one or more additional links, for example, an upper third link (link 3A) and a lower third link (link 3B), arranged in series with the first two links (link 2 and link 1) and coupled to the second link (link 2) via coaxial rotary joints 503.

The following terminology is used to describe the robot arm 505 of FIG. 5: The first link of the example robot arm 505 is referred to as link 1 or the upper arm 520, the second link is referred to link 2 or the forearm 521, the upper third link is referred to as link 3A or wrist A, and the lower third link is referred to as Link 3B or wrist B. The rotary joint 501 between the spindle assembly 580 and link 1 is referred to as the shoulder joint, the rotary joint 502 between link 1 and link 2 is referred to as the elbow joint, the rotary joint 503 between link 2 and link 3A is referred to as the wrist joint A, and the rotary joint 503 between link 2 and link 3A is referred to as the wrist joint B. Each of the wrists A and B may carry an end-effector 530 with a corresponding payload gripper 535 configured to accept a payload. Examples of payloads that may be accepted by the payload grippers 535 include, but are not limited to, semiconductor wafers.

Still referring to FIG. 5, link 1 may be actuated by motor M1, which may be housed in the spindle assembly 580 of the drive unit 510. Link 1 may house motor M2 configured to drive link 2. Link 2 may house one or more actuators (motors), each configured to drive one of the additional links coupled to link 2 via a wrist joint. In the particular example of FIG. 5, link 2 may house motors M3 and M4 configured to drive links 3A and 3B, respectively.

The drive unit 510 of the robot 500 may comprise a bellows 595 and a cylindrical barrier between the stator(s) and the rotor(s) of motor M1, similar to the example robot 100 of FIG. 3, to contain the vacuum environment 118 which may be present in the space where the robot arm 505 operates. In the robot 500, the bellows 595 may be configured to accommodate up and down motion of the spindle assembly 580. Alternatively, no barrier between the stator and rotor of motor M1 may be used, and the stator of motor M1 may be located in the vacuum environment 118.

The control system of the robot 500 may comprise the master controller 515, one or more control modules 516 located in a stationary manner in the drive unit 510, one or more control modules 517 attached to the spindle assembly 580, and one or more control modules 518 located in the robot arm 505. The master controller 515 and the control modules 516, 517, and 518 may be connected by a communication network.

In the example robot 500, the actuator associated with the elbow joint (motor M2) may be controlled by the control module 518 located in the upper arm 520, and the actuators associated with the wrist joints (motors M3 and M4) may be controlled by a control module 523 located in the forearm 521 (link 2). The control module 523 may also be connected to the controller 515 and the control modules 516, 517, and 518 by the communication network.

The actuator(s) located in the spindle assembly 580 of the drive unit 510 (motor M1), may be controlled by the control module 517 attached to the spindle assembly 580, which may move up and down with the spindle assembly 580. The Z-motor (Mz) may be controlled by the stationary control module 516 located, for example, at the base of the drive unit 510.

The control modules 516, 517, and 518 may be coordinated, for instance, over the communication network by the master controller 515 which may be also located, for example, at the base of the drive unit 510, as depicted in FIG. 5. Alternatively, the master controller 515 may be located outside of the drive unit 510, as shown in FIG. 4.

The control system may receive external inputs via the master controller 515, for example, from the user or a host system, read positions of individual motion axes (motors) from position encoders (not shown for simplicity), and process the information to apply voltages to the motors to perform the desired motion and/or achieve the desired position.

In the example robot 500 of FIG. 5, the upper arm 520 may be located in and be subject to the vacuum environment 118. The internal volume of the upper arm 520 may be sealed from the vacuum environment 118 and filled with air, another mix of gases, or a single gas, for example, nitrogen. As indicated in FIG. 5, the drive shaft 585 may extend into the internal volume of the upper arm 520, and the drive shaft 585 may be sealed at the lower end, forming a sealed cavity that can house electromechanical components and allow for their connectivity in a gaseous environment (as opposed to vacuum). As an example, the sealed cavity may house the control module 518 and a portion of the rotary coupling module.

Substantially the same upper arm arrangement can be utilized in robot 500 as was used in robot 300. In addition, the forearm 521 (link 2) of robot 500 may also be located in and be subject to the vacuum environment. In this case, the internal volume of the forearm may also be sealed from the vacuum environment and filled with air, another mix of gases, or a single gas, for example, nitrogen, forming a cavity that can house electromechanical components and allow for their connectivity in a gaseous environment (as opposed to vacuum).

In robot 500, the sealed cavity in the forearm 521 (link 2) may also house the stators of motors M3 and M4, in which case a cylindrical barrier between the stators and rotors of the motors M3 and M4 may be utilized to separate the internal volume of the upper arm 520 from the external vacuum environment. Alternatively, the stators of motors M3 and M4 may be located in the vacuum environment and an electrical feedthrough may be used to connect them with the control module located inside the sealed cavity.

In the robot 500, motors M3 and M4 as well as the control module 523 may be heat-sunk to the forearm 521 (link 2). In this arrangement, the heat produced by motors M3 and M4 as well as the control module 523 may be transferred through the forearm 521 (link 2) and radiated through the elbow joint to the upper arm 520.

In order to remove the heat produced by the motors and control modules 518 and 523 located in the robot arm 505, one or more of the rotary joints of the robot arm 505 may be complemented by one or more rotary thermal coupling arrangements or rotary thermal couplings 900 configured to transfer heat between the links connected by the corresponding rotary joint. In the robot 500, the shoulder joint 501 and the elbow joint 502 are each complemented by one rotary thermal coupling 900.

Figure 6A:
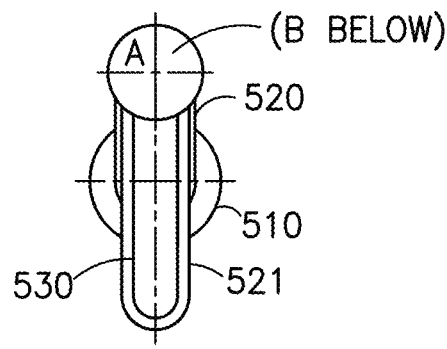
FIGS. 6A through 6G are diagrammatic top views of the robot of FIG. 5 showing forearms of the robot extended at various angles.
Figure 6B:
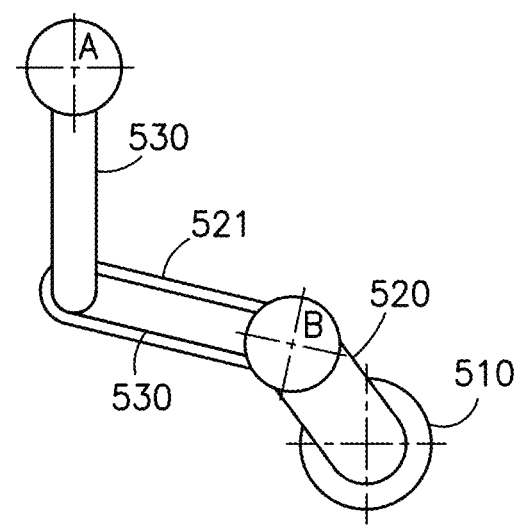
Figure 6C:
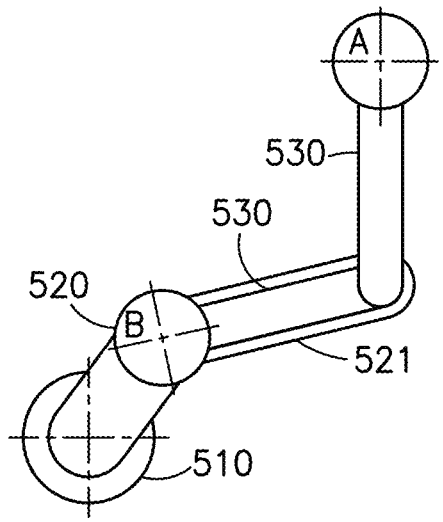
Figure 6D:
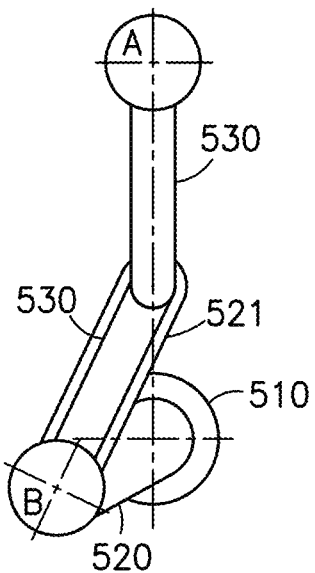
Figure 6E:
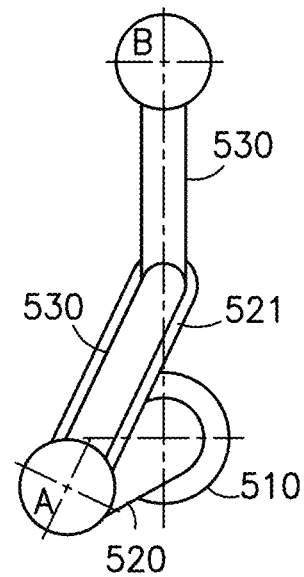
Figure 6F:
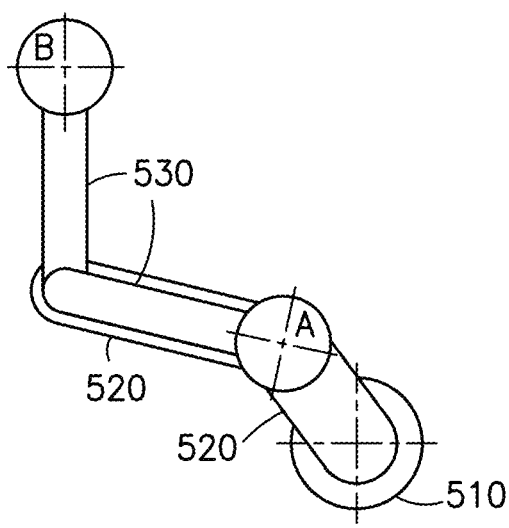
Figure 6G:
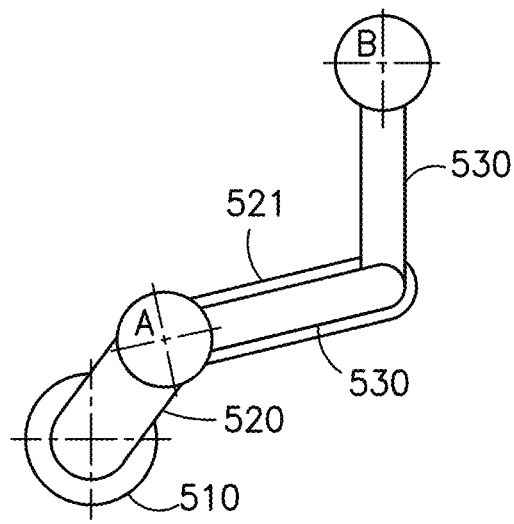

Referring now to FIGS. 6A through 6G, operation of the robot 500 is shown. FIG. 6A illustrates the robot 500 in a retracted position in which the forearm 521 (link 2) and the end-effectors 530 are positioned over the upper arm 520. FIGS. 6B and 6C illustrate the robot 500 in positions in which the upper arm 520, the forearm 521 (link 2), and an upper of the end-effectors 530 are extended away from the drive unit 510. FIG. 6D illustrates the robot 500 in a position in which the upper arm 520 is extended in one direction but forearm 521 (link 2) and the upper of the end-effectors 530 are extended in an opposing direction. FIG. 6E illustrates the robot 500 in a position in which the upper arm 520 is extended in one direction but forearm 521 (link 2) and the lower of the end-effectors 530 are extended in an opposing direction. FIGS. 6F and 6G illustrate the robot 500 in positions in which the upper arm 520, the forearm 521 (link 2), and the lower of the end-effectors 530 are extended away from the drive unit 510.

Figure 7A:
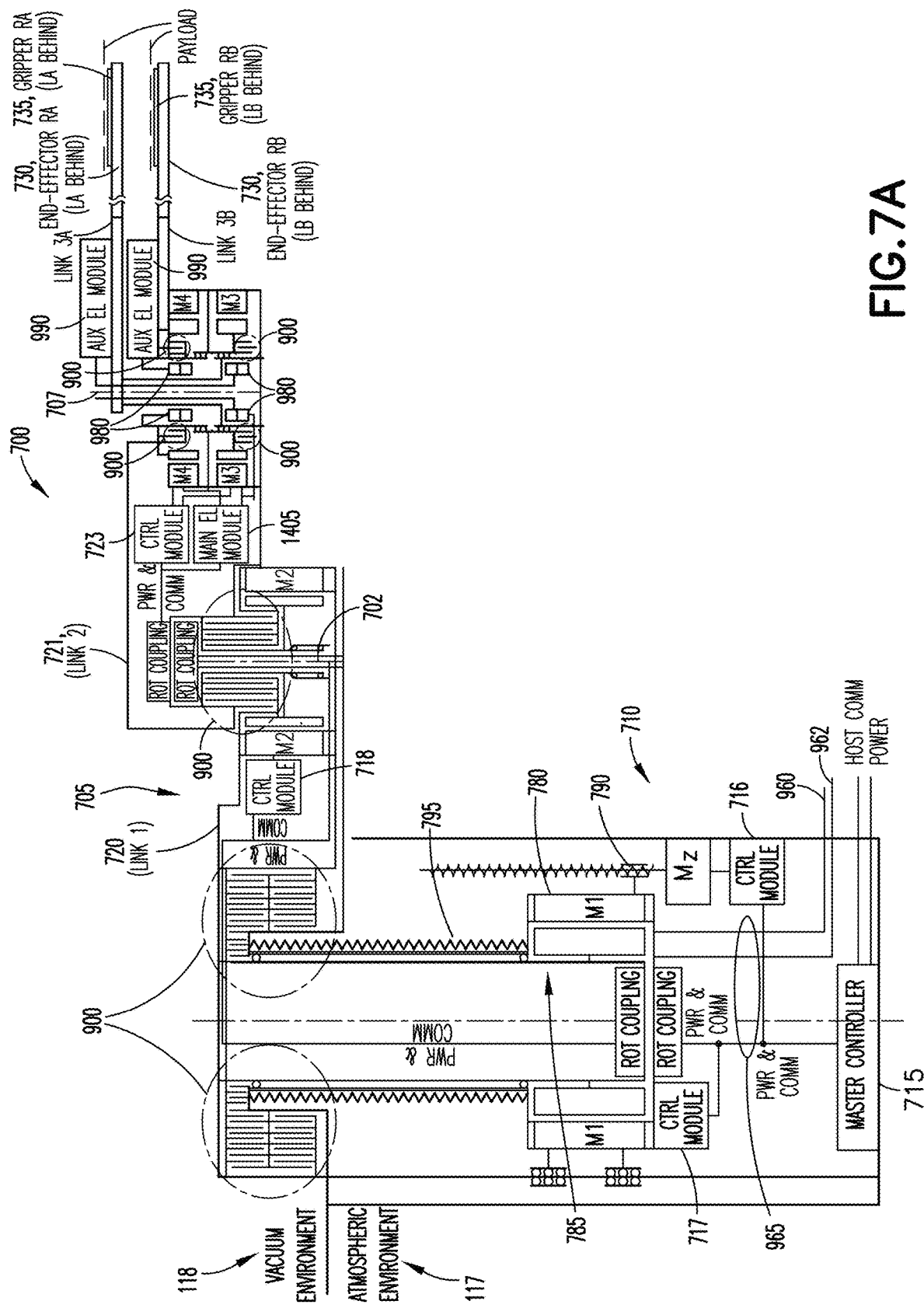
FIG. 7A is a schematic cross-sectional view of another example of a material-handling robot for use in a vacuum environment.
Figure 7B:
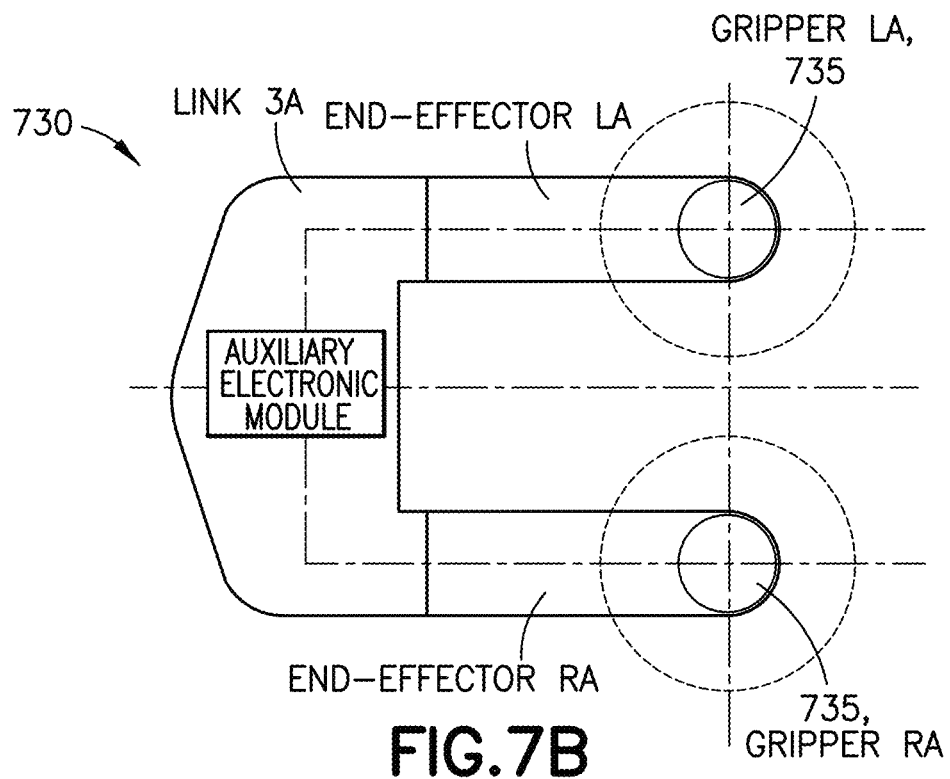
FIGS. 7B and 7C are schematic diagrams of end-effectors of the material-handling robot of FIG. 7A.
Figure 7C:
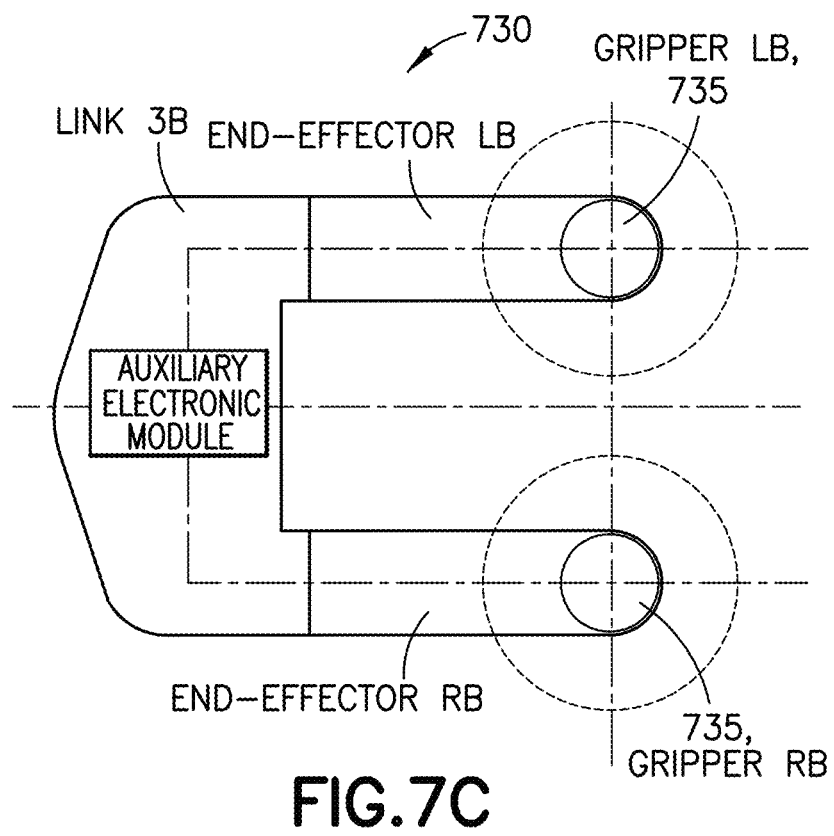
Figure 8A:
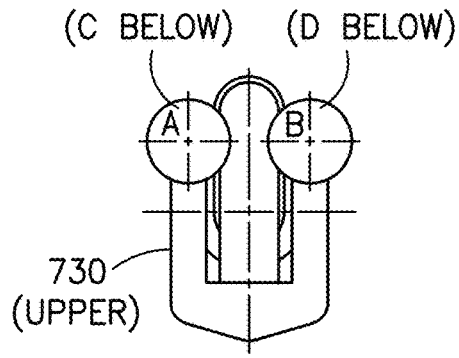
FIGS. 8A through 8G are diagrammatic top views of the robot of FIG. 7 showing forearms of the robot extended at various angles.
Figure 8B:
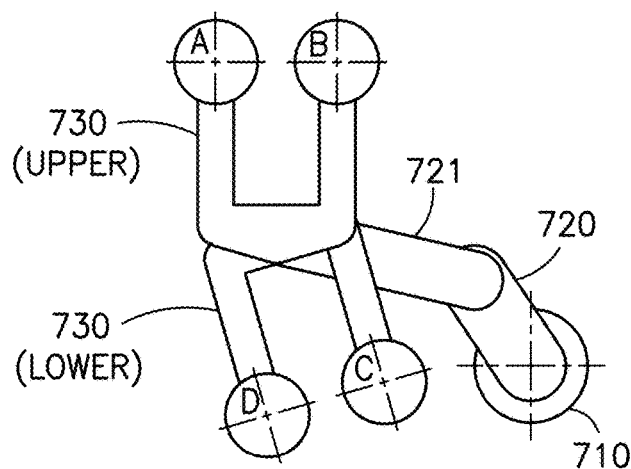
Figure 8C:
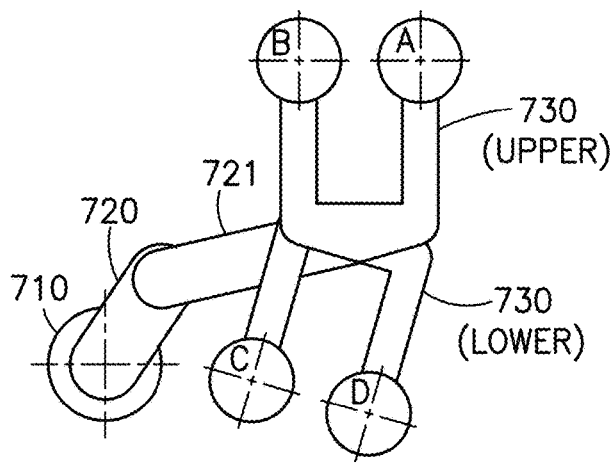
Figure 8D:
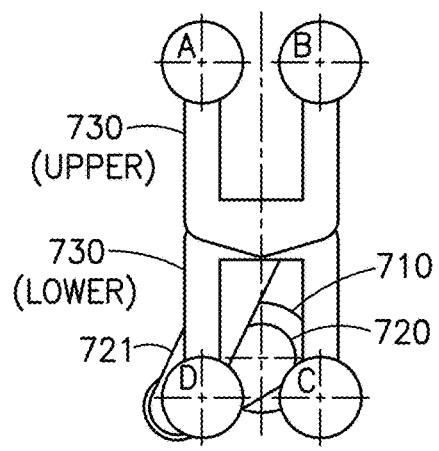
Figure 8E:
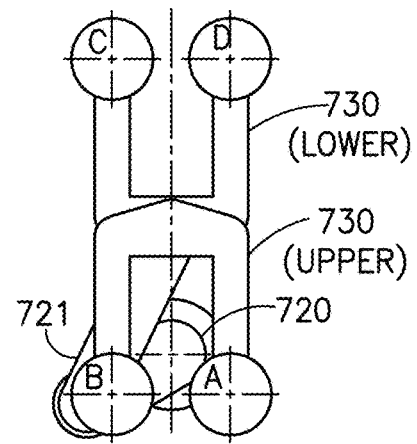
Figure 8F:
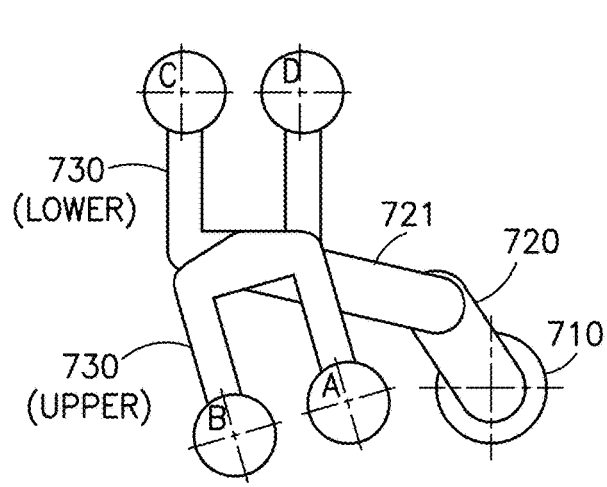
Figure 8G:
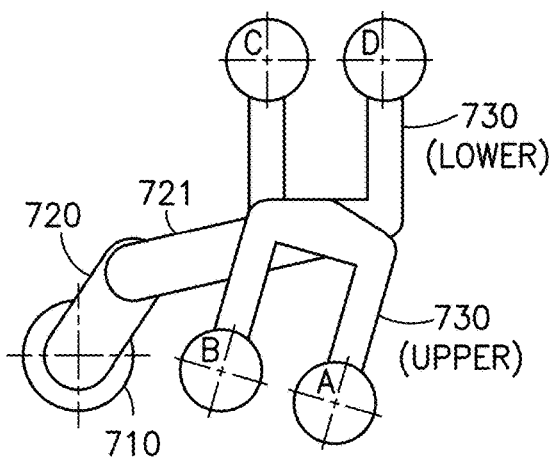

Referring now to FIG. 7A, another example of a vacuum-compatible material-handling robot is shown and is referred to as "robot 700." Robot 700 is similar to robots 300 and 500 in mechanical structure in that it comprises a drive unit 710, an upper arm 720 (link 1) rotatable about a shoulder 701, a forearm 721 (link 2) rotatable about an elbow 702, and end-effectors 730 rotatable about wrist joints 707. However, as shown in FIGS. 7B and 7C, in the robot 700, each of the wrist joints 707 on the forearm 721 may carry more than one end-effector 730. As shown in FIGS. 7B and 7C, each wrist joint 707 carries the two end-effectors 730, each of the end-effectors 730 having two payload grippers 735 in a side-by-side configuration and each gripper 735 being configured to accept a payload, such as a semiconductor wafer.

The drive unit 710 of the robot 700 may include a spindle assembly 780 with a drive shaft 785 and an optional vertical lift (Z-axis) mechanism 790. The Z-axis mechanism 790 of the robot 700 may be configured to move the spindle assembly 780 up and down, for example, via a ball-screw, using motor Mz. The spindle assembly 780 may comprise the shaft 785 connected to the upper arm 720, the drive shaft 785 being actuated by motor M1 to rotate the upper arm 720 about the shoulder 701.

The drive unit 710 of the robot 700 may comprise a bellows 795 and a cylindrical barrier between the stator(s) and the rotor(s) of motor M1, similar to the example robot 100 of FIG. 3, to contain the vacuum environment 118 which may be present in the space where the robot arm 705 operates. In the robot 700, the bellows 795, may be configured to accommodate up and down motion of the spindle assembly 780. Alternatively, no barrier between the stator and rotor of motor M1 may be used, and the stator of motor M1 may be located in the vacuum environment 118.

A control system of the robot 700 may comprise a master controller 715, one or more control modules 716 located in a stationary manner in the drive unit 710, one or more control modules 717 attached to the spindle assembly 780, and one or more control modules 718 located in the robot arm 705. The master controller 715 and the control modules 716, 717, and 718 may be connected by a communication network.

In the example robot 700 of FIGS. 7A through 7C, the actuator (motor M2) associated with the elbow joint 702 may be controlled by the control module 718 located in the upper arm 720, and the actuators (motors M3 and M4) associated with the wrist joints 707 may be controlled by a control module 723 located in the forearm 721.

The actuator(s) (motor M1) located in the spindle assembly 780 of the drive unit 710 may be controlled by the control module 717 attached to the spindle assembly 780, which may move up and down with the spindle assembly 780. The Z-motor (Mz) may be controlled by the stationary control module 716 located, for example, at the base of the drive unit 710.

The control modules 716, 717, and 718 may be coordinated, for instance, over a communication network, by the master controller 715 which may be also located, for example, at the base of the drive unit 710, as depicted in FIG. 7A. Alternatively, the master controller 715 may be located outside of the drive unit 710, as shown in FIG. 4.

The master controller 715 may receive external inputs, for example, from the user or a host system, read positions of individual motion axes (motors) from position encoders (not shown for simplicity), and process the information to apply voltages to the motors to perform the desired motion and/or achieve the desired position.

In the example robot 700 of FIGS. 7A through 7C, the upper arm 720 may be located in and be subject to the vacuum environment 118. The internal volume of the upper arm 720 may be sealed from the vacuum environment 118 and filled with air, another mix of gases, or a single gas, for example, nitrogen. As indicated in FIG. 4, the drive shaft 785 may extend into the internal volume of the upper arm 720, and the drive shaft 785 may be sealed at the lower end, forming a sealed cavity that can house electromechanical components and allow for their connectivity in a gaseous environment (as opposed to vacuum). As an example, the sealed cavity may house the control module 717 and a portion of the rotary thermal coupling 900.

Substantially the same upper arm arrangement can be utilized in robot 700 as was used in robot 300. In addition, the forearm 721 of the robot arm 705 of robot 700 may also be located in and be subject to the vacuum environment. In this case, the internal volume of the forearm may also be sealed from the vacuum environment and filled with air, another mix of gases, or a single gas, for example, nitrogen, forming a cavity that can house electromechanical components and allow for their connectivity in a gaseous environment (as opposed to vacuum).

In robot 700, the sealed cavity in the forearm 721 may also house the stators of motors M3 and M4, in which case a cylindrical barrier between the stators and rotors of the motors M3 and M4 may be utilized to separate the internal volume from the external vacuum environment. Alternatively, the stators of motors M3 and M4 may be located in the vacuum environment and an electrical feedthrough may be used to connect them with the control module located inside the sealed cavity.

In robot 700, motors M3 and M4 as well as the control module 723 may be heat-sunk to the forearm 721. In this arrangement, the heat produced by motors M3 and M4 as well as the control module may be transferred through the forearm 721 and radiated through the elbow joint 702 to the upper arm 720.

In order to remove the heat produced by the motors and control modules located in the robot arm, one or more of the rotary joints of the robot arm may be complemented by one or more thermal coupling arrangements configured to transfer heat between the links connected by the corresponding rotary joint. In robot 700, the shoulder joint 701 and the elbow joint 702 are each complemented by one rotary thermal coupling arrangement 900.

Referring now to FIG. 8, operation of the robot 700 is shown. FIG. 8A illustrates the robot 700 in which both the upper arm 720 and the forearm 721 are retracted such that the two end-effectors 730 are in a side-by-side arrangement and aligned and in a "ready" position. FIGS. 8B and 8C illustrate the upper arm 720 and the forearm 721 extended and such that the upper end effector 730 is extended in the same direction as the forearm 721 while the lower end effector 730 is extended in a direction opposite to the upper end effector 730. FIGS. 8D and 8E illustrate the robot 700 in which the upper arm 720 is extended in one direction and the forearm 721 is extended in an opposing direction, with the upper and lower end effectors 730 being orientated 180 degrees from each other. FIGS. 8F and 8G illustrate the upper arm 720 and the forearm 721 extended such that the lower end effector 730 is extended in the same direction as the forearm 721 while the upper end effector 730 is extended in a direction opposite to the lower end effector 730.

Figure 9A:
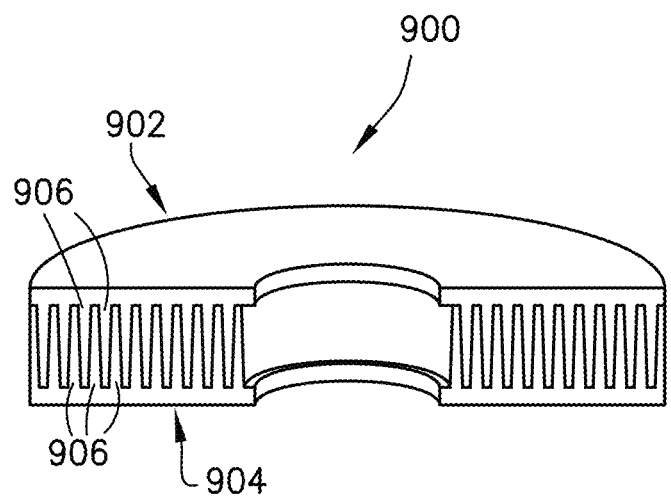
FIGS. 9A and 9B are cutaway views of examples of rotary thermal couplings.

Referring now to FIG. 9A, an example rotary thermal coupling 900 is shown. The rotary thermal coupling 900 may be utilized at a rotary joint, for example, at the elbow joint 502 of the example robot arm 505 of robot 500 of FIG. 5, and at the elbow joint 702 of the example robot arm 705 of robot 700 of FIG. 7A. The rotary thermal coupling 900 may comprise two portions, namely, a first portion 902 and a second portion 904, each of the first portion 902 and the second portion 904 featuring one or more fins 906 or fin-like protrusions such that when the first portion 902 is assembled with the second portion 904, the first portion 902 and the second portion 904 are coaxially aligned, and the fins 906 on the first portion 902 are nested with the fins 906 on the second portion 904 such that a fin surface on the first portion 902 faces an opposing fin surface on the second portion 904 and a gap is defined between the opposing facing fin surfaces so that heat can be transferred via radiation from the fins 906 on the first portion 902 to the fins 906 on the second portion 904. The transfer of heat via radiation may be supplemented by convection/conduction through an environment between the opposing fin surfaces if the rotary thermal coupling 900 is used in a vacuum environment in which residual gases are present.

In the example rotary thermal coupling 900 as shown in FIG. 9A, an array of the fins 906 or fin-like protrusions may be provided on each of the first portion 902 and the second portion 904, and the arrays arranged in an interleaving manner in order to increase the effective area and minimize the volume occupied by the example rotary thermal coupling 900.

Figure 9B:
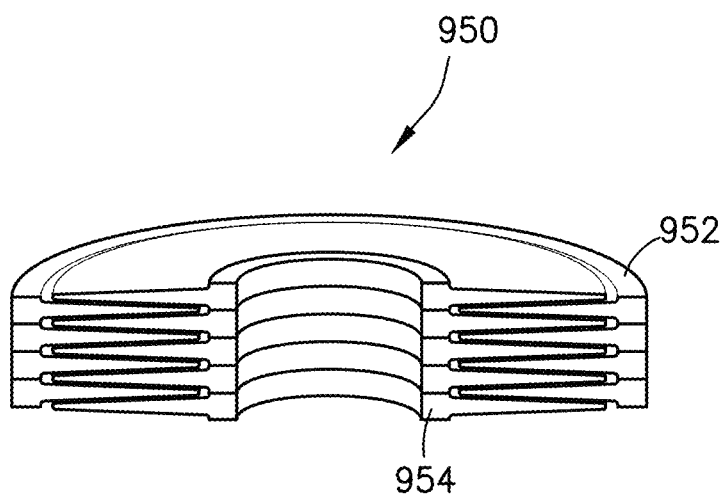

Alternatively, as depicted in the example of FIG. 9B, another example of a rotary thermal coupling 950 may comprise a first portion 952 and a second portion 954 arranged as inner and outer disks, the two portions providing opposing fins 956 or fin-shaped features configured for contactless heat transfer across a gap defined between the fins 956 on each of the first portion 952 and the second portion 954. As another alternative, any other suitable shapes of the effective features of the rotary thermal couplings 900 and 950, including but not limited to conical and spherical shapes, and their combination may be utilized.

The effective surfaces of the rotary thermal coupling 900 (as well as the rotary thermal coupling 950) may be treated to improve their thermal emissivity. For example, the first and second portion of each rotary thermal coupling 900, 950 may be made of aluminum, and the effective surfaces may be anodized.

In order for the example rotary thermal coupling 900 to facilitate heat transfer between two links of a robot arm, one of the first portion 902 and the second portion 904 may be attached to one link (for example, link 1 in robot 500 as shown in FIG. 5 or link 1 in robot 700 as shown in FIG. 7A) and the other of the first portion 902 and the second portion 904 may be attached to a neighboring link (for example, link 2 in robot 500 in as shown in FIG. 5 or link 2 in robot 700 as shown in FIG. 7A) in an arrangement substantially coaxial with the rotary joint connecting the two links (for example, the elbow joint in robot 500 in as shown in FIG. 5 or the elbow joint in robot 700 as shown in FIG. 7A). Alternatively, the features of the rotary thermal coupling 900 may be incorporated directly into the links of the robot arm 505 (or into the links of the robot arm 705). As another example, a rotary thermal coupling 900 may be utilized in a similar manner to transfer heat from the upper arm to the neck of the spindle assembly 580 or 780. In any of the disclosed example embodiments, the rotary thermal coupling 950 may be used in place of the rotary thermal coupling 900.

Referring now to FIGS. 4, 5, and 7A, in order to reduce the temperature of the necks of the spindle assemblies 380, 580, and 780 as well as the temperatures of the spindle assemblies 380, 580, and 780 themselves and to achieve more effective heat transfer away from the upper arms 320, 520, and 720, a housing of each respective spindle assembly 380, 580, and 780 and/or the neck of the respective spindle assembly 380, 580, and 780 may be liquid cooled. As an example, a liquid cooling system may be of an open-loop configuration where a liquid, such as water, is supplied to the robot 300, 500, or 700 from an external source and through a cooling inlet line 960 and taken off the robot 300, 500, 700 through a cooling outlet line 962. As another example, the liquid cooling system may be of a closed-loop configuration where a liquid, such as water, is circulated internally within the robot 300, 500, 700. In example embodiments using the closed-loop system, a pump may be configured to force the liquid through the cooling system. A radiator with or without a fan may be utilized to extract heat from the liquid. Alternatively, a refrigeration unit may be employed to lower the temperature of the liquid.

As indicated in FIGS. 4, 5, and 7A, the drive unit 310, 510, and 710 of the respective example robots 300, 500, and 700 may feature a service loop 965, which may be configured to electrically connect the spindle assemblies 380, 580, and 780 with the stationary portions of the respective drive unit 310, 510, and 710. The service loop 965 in each example robot 300, 500, and 700 may be used for power and signal transmission as well as for electrical grounding purposes. The service loop 965 may also be used to channel liquid coolant to and from the spindle assembly 380, 580, and 780.

The example robots 300, 500, 700 may also employ one or more rotary couplings 980. Each rotary coupling 980 may be configured to transmit power through a rotary joint and/or a communication link configured to transmit communication signals through a rotary joint. For example, as indicated in FIGS. 4, 5, and 7A, a rotary coupling 980 may be utilized to transmit power from the spindle assembly 380, 580, and 780 to the respective upper arm 320, 520, and 720 and also to transmit communication signals between the spindle assembly 380, 580, and 780 and the respective upper arm 320, 520, and 720. As another example, as shown in FIGS. 5 and 7, a rotary coupling 980 may be utilized to transmit power from the upper arm 520 and 720 to the forearm 521 and 721 and to transmit communication signals between the upper arm 520 and 720 and the forearm 521 and 721.

The rotary coupling(s) 980 in any of robots 300, 500, 700 may operate on various physical principles and their combinations, including slip-ring arrangements, which may comprise one or more electrically conductive rings, each in contact with one or more electrically conductive brushes, a slip-ring arrangement wetted by an electrically conductive fluid, such as an ionic liquid a contactless capacitive coupling and a contactless inductive coupling.

Figure 10A:
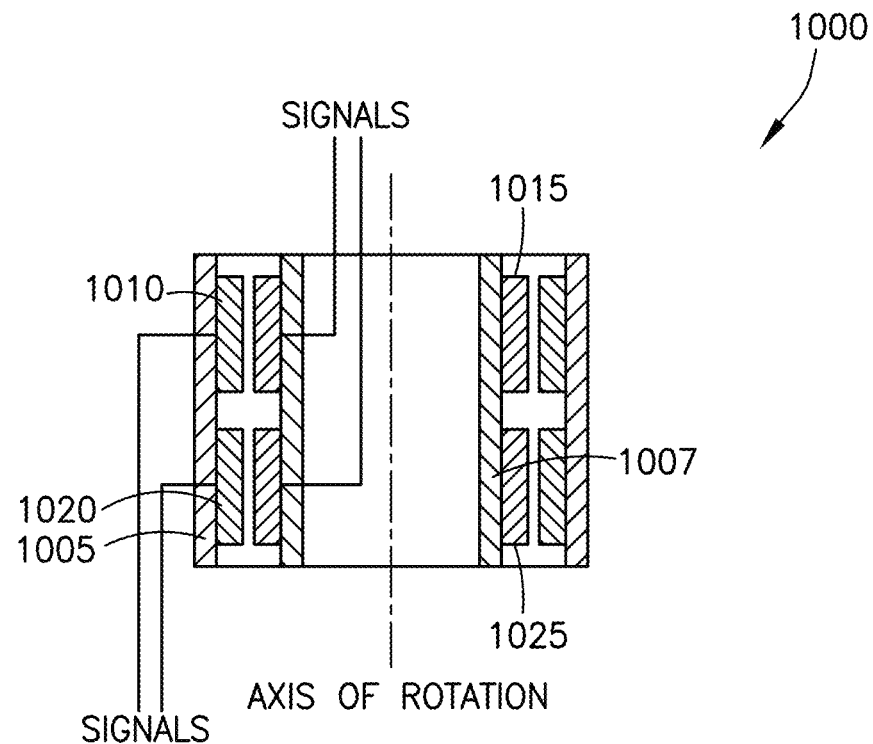
FIGS. 10A and 10B are schematic diagrams of example capacitive rotary couplings.

Referring now to FIG. 10A, one example of a capacitive rotary coupling is shown generally at 1000. The capacitive rotary coupling 1000 may be used in place of the rotary coupling 980. The capacitive rotary coupling 1000 is arranged in a radial configuration. In FIG. 10A, an annular arrangement of cylinders is disposed around an axis of rotation, the annular arrangement of cylinders comprising an outer cylinder portion 1005 and an inner cylinder portion 1007. A first outer ring 1010 is disposed on an inner surface of the outer cylinder portion 1005, and a first inner ring 1015 is disposed opposite the first outer ring 1010 and on an outer surface of the inner cylinder portion 1007. A second outer ring 1020 and a second inner ring 1025 is similarly positioned proximate the first outer ring 1010 and the first inner ring 1015. Signals are fed through the inner and outer rings.

Figure 10B:
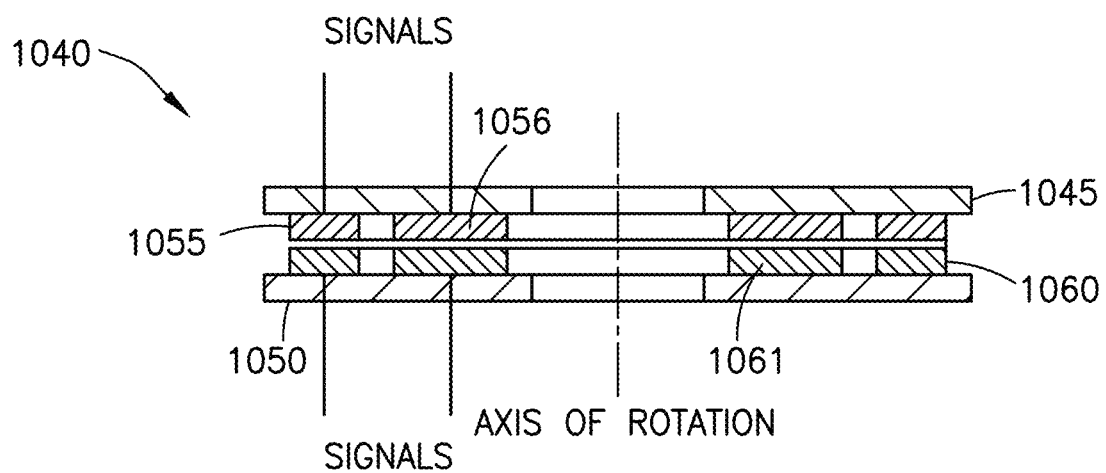

Referring now to FIG. 10B, another example of a capacitive rotary coupling is shown generally at 1040. The capacitive rotary coupling 1040 is arranged in an axial configuration. An upper disk portion 1045 and a lower disk portion 1050 are arranged around an axis of rotation. The upper disk portion 1045 includes upper rings 1055 and 1056, and the lower disk portion includes lower rings 1060 and 1061. Signals are fed through the upper and lower rings. The capacitive rotary coupling 1000 as well as the capacitive rotary coupling 1040 may be utilized as a power coupling and/or as a communication link.

Figure 11:
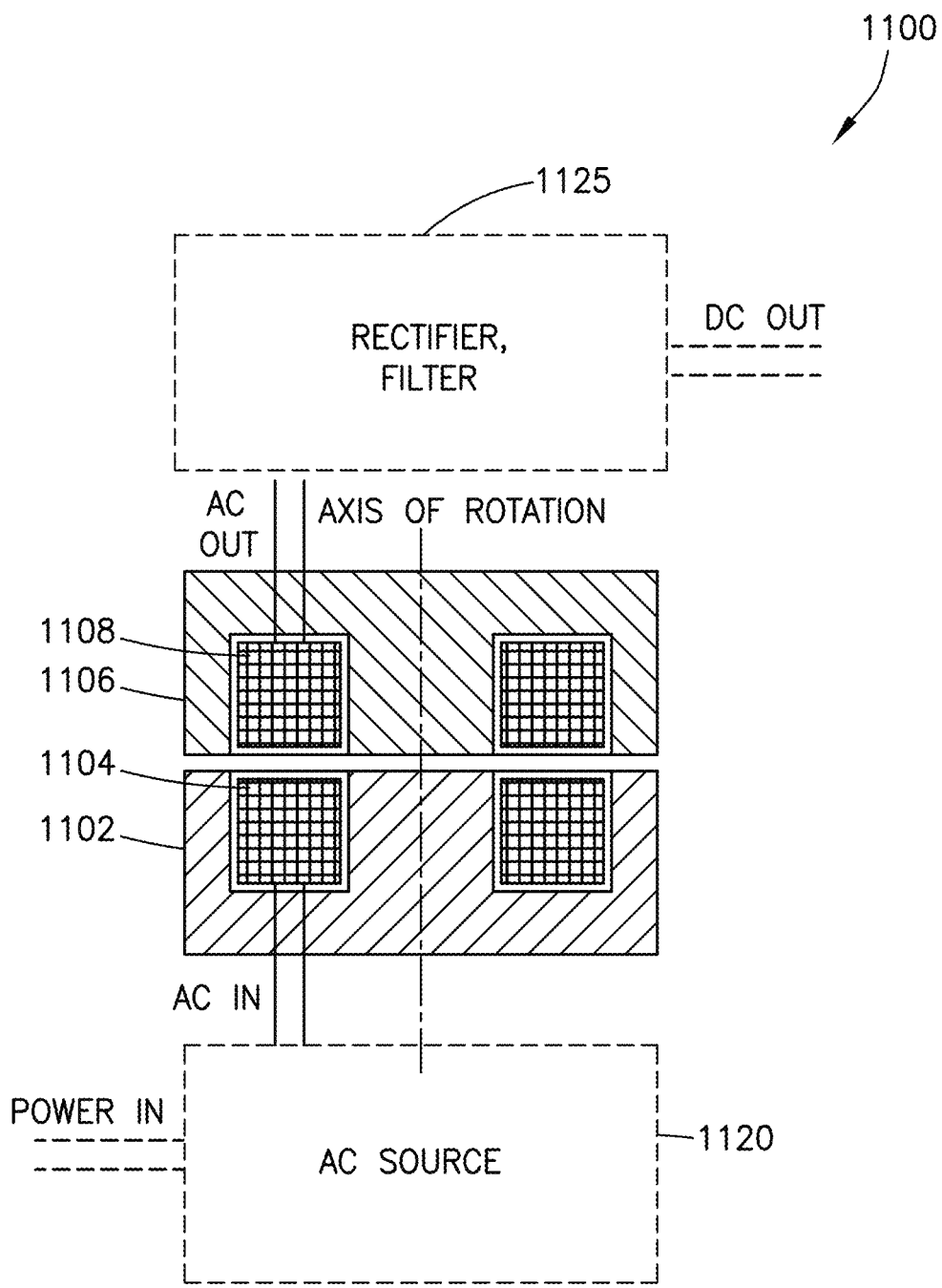
FIG. 11 is a schematic diagram of an inductive power coupling.

Examples of a power coupling operating on an inductive principle are described in U.S. Patent Application Publication Nos. 2016/0229296, 2018/0105044, and 2018/0105045, which are hereby incorporated by reference in their entireties. A simplified cross-sectional view of a suitable example configuration of an inductive power coupling is depicted schematically at 1100 in FIG. 11 and is hereinafter referred to as "power coupling 1100." The power coupling 1100 comprises a primary core 1102 having a primary coil 1104 and a secondary core 1106 having a secondary coil 1108, the primary core 1102 and the secondary core 1106 being arranged about an axis of rotation. A source 1120 inputs alternating current (AC) into the primary coil 1104 and through the secondary coil 1108 to a rectifying filter 1125. The power coupling 1100 may be utilized to supply electric power to the control modules and directly or indirectly to other active devices, such as position encoders and other sensors, in the robot arm.

Figure 12:
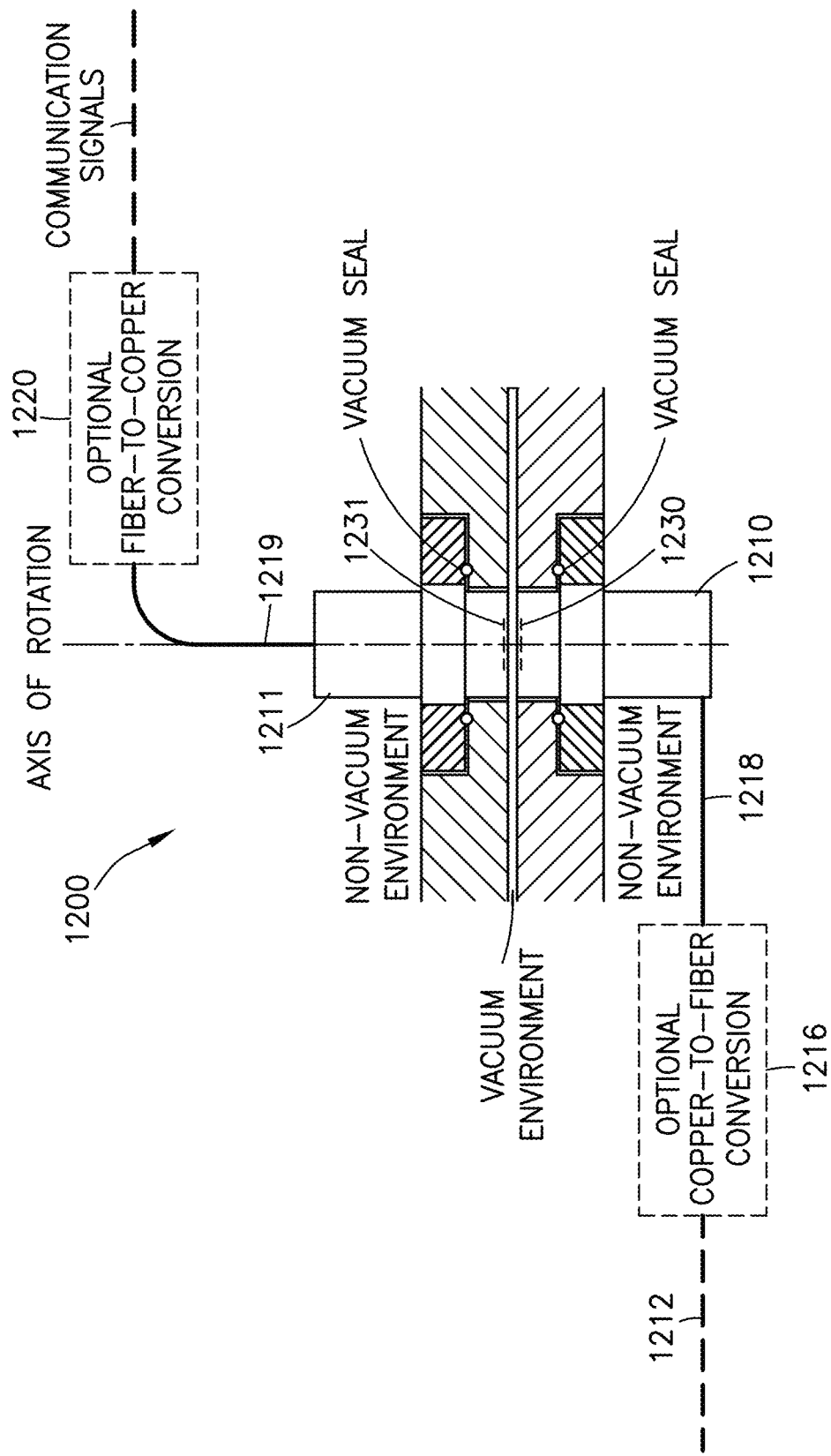
FIG. 12 is a schematic diagram of a communication link.

Referring now to FIG. 12, an example communication link is shown generally at 1200 and is hereinafter referred to as "communication link 1200." Communication link 1200 may be an optical communication link for use with any of the example robots disclosed herein. The communication link 200 may comprise a first optical communication module 1210 and a second optical communication module 1211 arranged about an axis of rotation, one being stationary with respect to the housing of the spindle assembly into which the communication link 1200 is incorporated, and the other being rotatable together with the upper arm of the robot. In the communication link 1200 of FIG. 12, the two optical communication modules 1210 and 1211 may be maintained in alignment utilizing the bearing of any rotary joint of a robot (for example, robot 700), or an additional bearing may be integrated into the communication link 1200 to maintain a high degree of alignment of the two optical communication modules 1210 and 1211 regardless of potential compliance of the structure of the robot under various static and dynamic load conditions. The first optical communication module 1210 comprises a first sealed optical element 1230, and the second optical communication module 1211 comprises a second sealed optical element 1231, the first sealed optical element 1230 and the second sealed optical element 1231 being arranged to face each other across a portion of the vacuum environment. A first fiber optic cable 1218 extends into the first optical communication module 1210, and a second fiber optic cable 1219 extends from the second optical communication module 1211.

The communication link 1200 may feature optional electronics to convert electrical signals into optical signals and vice versa (see copper-to-fiber conversion block 1216 and fiber-to-copper conversion block 1220). The conversion electronics (copper-to-fiber conversion block 1216 and fiber-to-copper conversion block 1220) may be in the form of separate modules, for example, printed circuit boards. The communication link 1200 may facilitate contactless data transfer between the spindle assembly and the upper arm of a robot (for example, robot 700). As an example, the communication link 1200 may be incorporated into the communication network of the control system to facilitate bidirectional data transfer to and from the motor control module(s).

Figure 13:
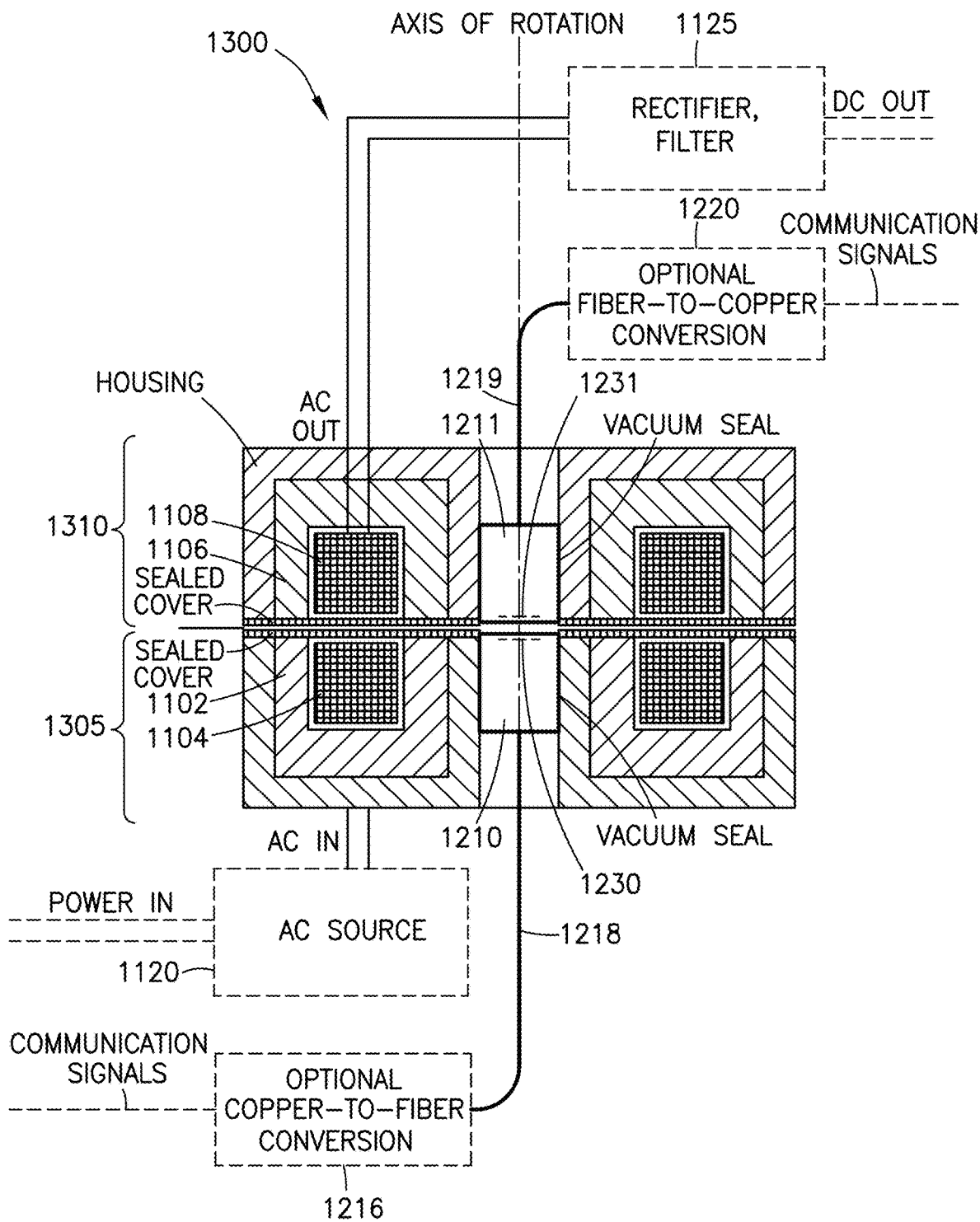
FIG. 13 is a schematic diagram of a rotary coupling assembly that integrates a rotary power coupling with a communication link.

Referring now to FIG. 13, the communication link 1200 (of FIG. 12) may be combined with the power coupling 1100 (of FIG. 11) into an integrated rotary coupling assembly 1300.

As depicted in FIG. 13, the integrated rotary coupling assembly 1300 features two portions, a lower portion 1305 stationary with respect to the housing of the spindle assembly of a robot (for example, robot 300, 500, or 700) and an upper portion 1310 rotating together with the upper arm (for example, upper arm 320, 520, or 720) of the robot. The two portions of the integrated rotary coupling assembly 1300 may be maintained in alignment utilizing the bearing of the rotary joint of the robot, or an additional bearing may be utilized to maintain a high degree of alignment of the optical communication link regardless of potential compliance of the structure of the robot under various static and dynamic load conditions.

A more detailed description of the above arrangements that may be utilized to support the architecture with distributed actuators as well as additional and alternative suitable arrangements can be found in U.S. patent application Ser. No. 17/172,209 filed on Feb. 10, 2021, which is hereby incorporated by reference in its entirety. U.S. Pat. Nos. 10,569,430 and 10,224,232, which are hereby incorporated by reference in their entireties, also show and describe actuators and sensors distributed at various location in a robot including the robot drive and robot arm.

The example robot 100 as shown in FIGS. 1 and 3 may include an integrated payload gripping system. The payload gripping system may be an electrostatic discharge (ESD) system that comprises a main electronic module 1405, a rotary coupling 980 at the shoulder joint, one or more rotary couplings 980 at the elbow joint(s), one or more optional auxiliary electronic modules 990, each associated with a respective forearm 125, and one or more payload grippers 135, each associated with a respective end-effector 130. In addition, optional rotary thermal couplings 900 may be employed at the joints to improve thermal management of the system.

Similarly, the example robot 300 of FIG. 4 may also include an integrated payload gripping system (ESD system), which may comprise the main electronic module 1405 attached to or in the upper arm 320, one or more rotary couplings 980 at the elbow joint(s), one or more optional auxiliary electronic modules 990, each associated with a respective forearm 325, and one or more payload grippers 335, each associated with a respective end-effector 330. In addition, optional rotary thermal couplings 900 may be employed at the elbow joint(s) to improve thermal management of the system.

As another example, the robot 500 of FIG. 5 may include an integrated payload gripping system (ESD system), which may comprise the main electronic module 1405 attached to or in link 2 (forearm), one or more rotary couplings 980 at the wrist joint(s) 503, one or more optional auxiliary electronic modules 990, each associated with a respective wrist joint 503, and one or more payload grippers 535, each associated with a respective end-effector 530. In addition, optional rotary thermal couplings 900 may be employed at the wrist joint(s) 503 to improve thermal management of the system.

As still another example, the robot 700 of FIG. 7 may include an integrated payload gripping system substantially identical to that of robot 500 of FIG. 5 except for the number of payload grippers 735. Left and right gripping modules (grippers 735), such as gripper LA and gripper RA, may be controlled in sync, for example, they may be connected in parallel in a corresponding auxiliary electronic module 990. If no auxiliary electronic module 990 is used, gripper LA and gripper RA may be connected in parallel after the corresponding wrist joint rotary coupling. Alternatively, gripper LA and gripper RA may be controlled independently by the corresponding auxiliary electronic module 990. If no auxiliary electronic module is used, gripper LA and gripper RA may be controlled independently by the main electronic module 1405 through separate rotary couplings 980 or through shared multichannel rotary couplings.

Figures 14, 14A, 14B:
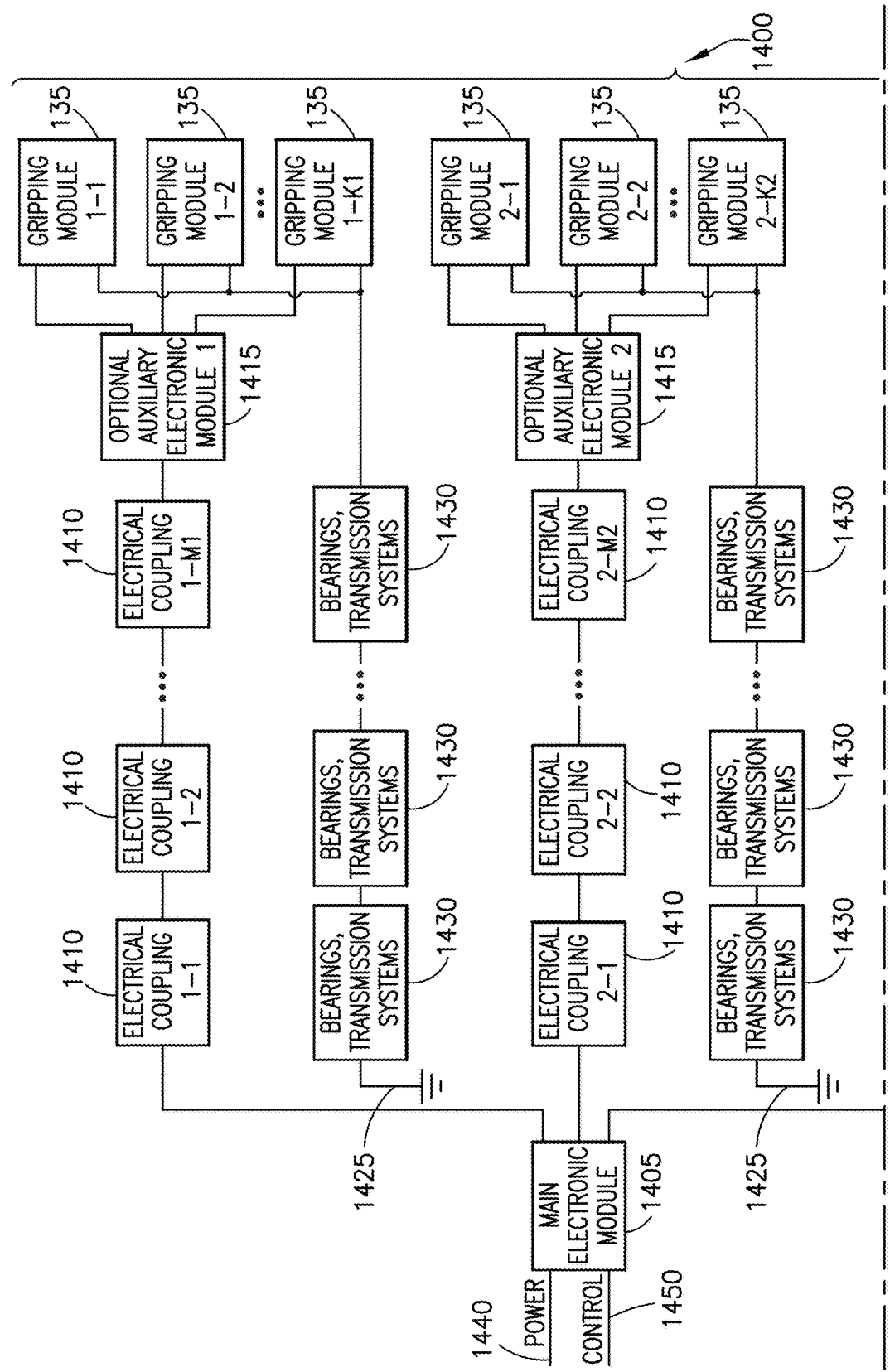
FIG. 14 is a block diagram illustrating an example architecture of an example payload gripping system.
Figure 14B:
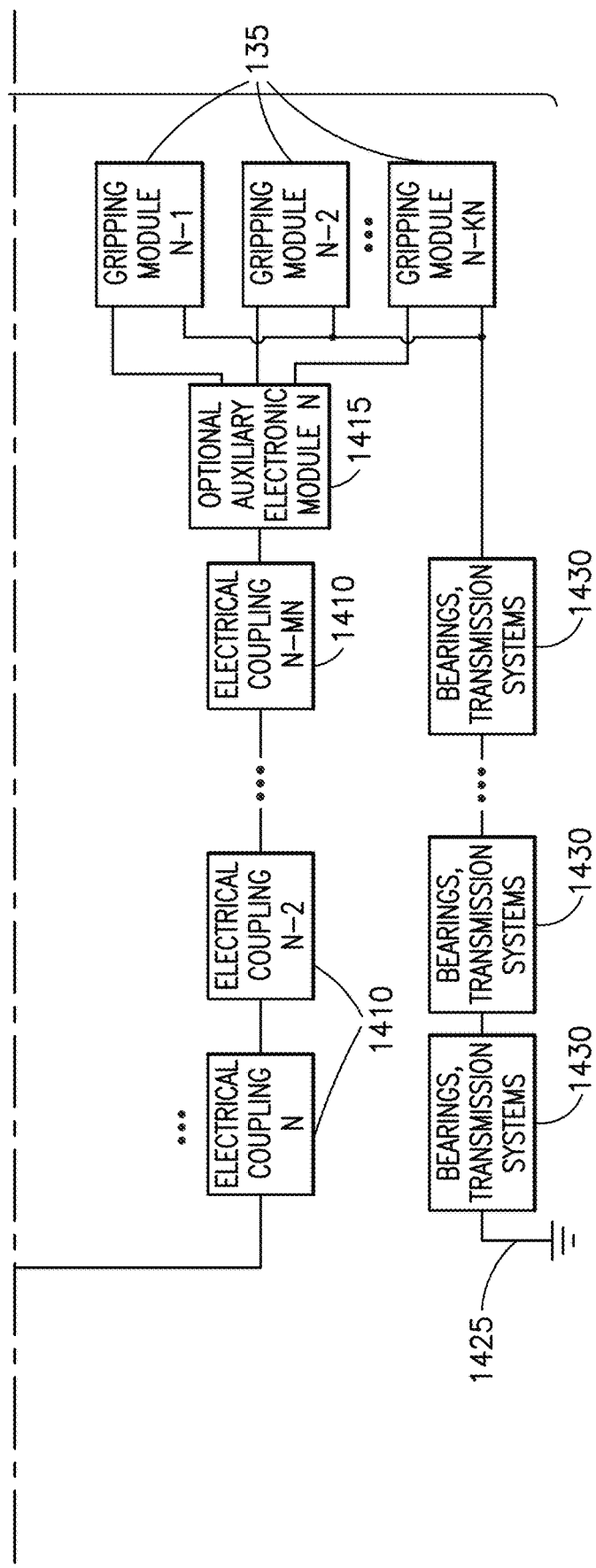

The architecture of the payload gripping system utilized in the example robots depicted in FIGS. 1 through 7C can be generally represented by the block diagram of FIG. 14.

Furthermore, the block diagram of FIG. 14 encompasses additional configurations of the present payload gripping system that may be utilized in various structures and configurations of vacuum-environment material-handling robots, including robots with multiple linkages, various types of single- and multi-axis joints, and multiple end-effectors. The architecture depicted in FIG. 14 also allows the payload gripping system(s) and payload grippers to be configured to provide independent and/or synchronized control of payload on various end-effectors of the example robots described herein.

In general, as depicted in the block diagram of FIG. 14, the payload gripping system according to the present invention is shown generally at 1400. System 1400 may comprise the main electronic module 1405, one or more electrical couplings 1410 (in parallel and/or in serial arrangements), one or more optional auxiliary electronic modules 1415, and one or more gripping modules or grippers 135. Grippers 135 may be similar or analogous to grippers 335, 535, and 735 as disclosed above. In FIG. 14, N is the number of parallel electrical branches, Mi is the number of electrical couplings arranged in series in each electrical branch, I=1, 2, . . . , N, and Ki is the number of grippers 135 connected to each electrical branch, I=1, 2, . . . , N.

As shown in FIG. 14, the payload gripping system 1400 may further utilize a ground connection 1425, which may be provided through bearings of the joints of the robot and the transmission systems (pulleys, belts, bands and/or cables) (see blocks designated as 1430) of the robot arm. The quality of the ground connection 1425 may depend on the specific design, and may be imperfect (for instance, intermittent and/or exhibiting undesirable resistance).

If there are multiple grippers 135 connected to an electrical branch, such as grippers 135 or gripping modules 1-1 to 1-K1 as indicated in FIG. 14, and no auxiliary electronic module is present, the gripping modules are assumed to be connected in parallel.

When more than one parallel electrical branches are routed through the same joint, the electrical couplings associated with these branches may be combined into a single multichannel electrical coupling as opposed to having a dedicated electrical coupling for each of the electrical branches routed through the joint.

It should be noted that FIG. 14 is intended for exemplary illustration purposes only. The actual structure of a particular configuration of the gripper 135 or payload gripping system 1400 may extend beyond the structure shown in the block diagram of FIG. 14. For example, additional electrical branches may emanate from and/or after any of the modules (blocks), allowing for any combination of parallel and serial arrangements.

As indicated in FIG. 14, the main electronic module 1405 may receive power 1440, for example, in the form of a DC or AC voltage. The main electronic module 1405 may also receive a control signal 1450 (or signals), for instance, from the control system of the robot 100 (or other robot 300, 500, or 700), and it may communicate back information, such as status, payload presence, and/or quality of grip. In the example robots with distributed actuators of FIGS. 4, 5, and 7A, the nearest control module may be used to provide the control signal (or signals) to the main electronic module 1405 and receive information from the main electronic module 1405. Alternatively, the main electronic module 1405 of the payload gripping system 1400 may communicate directly with the control system 115 (or the master controller 315, 515, or 715 in the control systems of robots 300, 500, or 700, respectively).

Figure 15A:
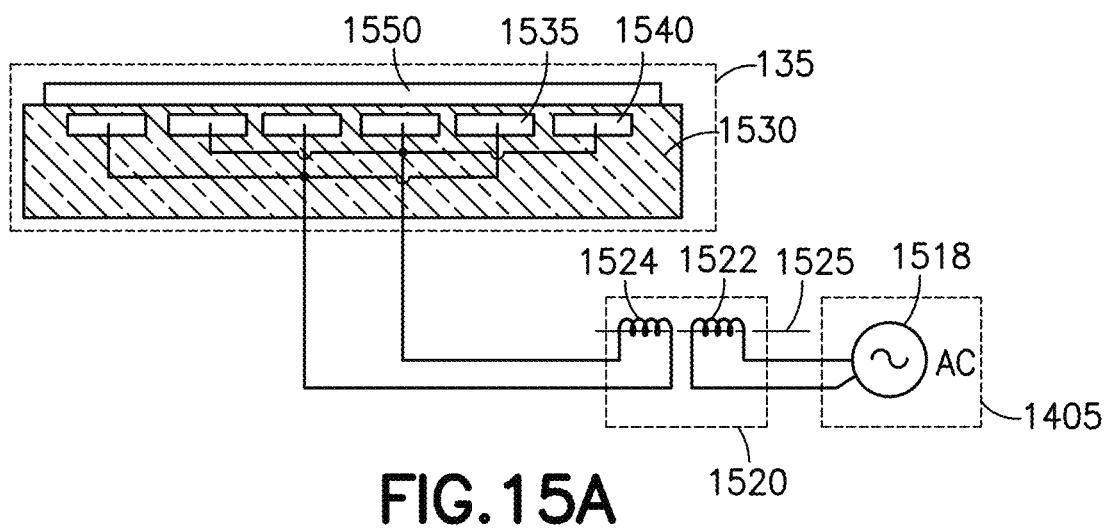
FIGS. 15A through 15M are schematic diagrams of example embodiments of integrated payload grippers.

In one example embodiment, as shown in FIG. 15A, the main electronic module 1405 may include AC source 1518. The main electronic module 1405 may also include optional circuitry, or its portion, to detect a payload and/or to assess the quality of grip by the gripper 135. Although gripper 135 is described with reference to FIGS. 15A through 15M, the example embodiments described herein are equally applicable to grippers 335, 535, and 735. The main electronic module 1405 may be configured to accept power input and control signals. The power input may be utilized to power AC source 1518 and other circuitry of the main electronic module 1405. The control signals may be used to activate, deactivate, modify, or otherwise control AC source 1518. The voltage from AC source 1518 may be channeled through an electrical coupling 1520 to gripping module 135.

Electrical coupling 1520 may operate on an inductive principle. As an example, electrical coupling 1520 may comprise a pair of inductively coupled coils, namely primary coil 1522 and secondary coil 1524. Coils 1522 and 1524 may be free to move with respect to each other, for example, they may rotate with respect to each other about ° axis 1525. In such a rotary configuration, they may be arranged in an axial arrangement, as described earlier with respect to FIG. 11, where the magnetic flux travels across a planar gap between primary coil 1522 and secondary coil 1524 in a direction substantially parallel to axis 1525. Alternatively, coils 1522 and 1524 may be arranged in a radial arrangement, where the magnetic flux between coils 1522 and 1524 travels radially across a cylindrical gap between coils 1522 and 1524.

If desired, coils 1522 and 1524 of electrical coupling 1520 may be selected so that electrical coupling 1520 may be utilized to step up the voltage provided by main electronic module 1405.

As depicted in FIG. 15A, gripping module 135 may comprise a dielectric (for example, ceramic) substrate or foundation 1530 with one or more payload-facing surfaces and at least one electrode, such as electrodes 1535 and 1540, configured to produce an attractive force between gripping module 135 and payload 1550 resting on the end-effector 135 of the robot 100 when the at least one electrode is energized, for instance, by applying an AC voltage received through electrical coupling 1520 from the main electronic module 1405. As an example, the application of an AC voltage to electrodes 1535 and 1540 may create electric charge distributions on the electrodes 1535 and 1540 and, in turn, these charge distributions may induce charges of opposite polarity on the payload 1550. The interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload 1550 and prevent slippage of the payload 1550 on the end-effector 130.

The operation of the example payload gripping system 1400 according to FIG. 15A can be summarized as follows: When the main electronic module 1405 applies AC voltage through electrical coupling 1520 to gripper 135, an attractive force between the payload 1550 and the gripper 135 may be produced. The attractive force may remain present as long as the main electronic module 1405 continues to apply the AC voltage.

Figure 15B:
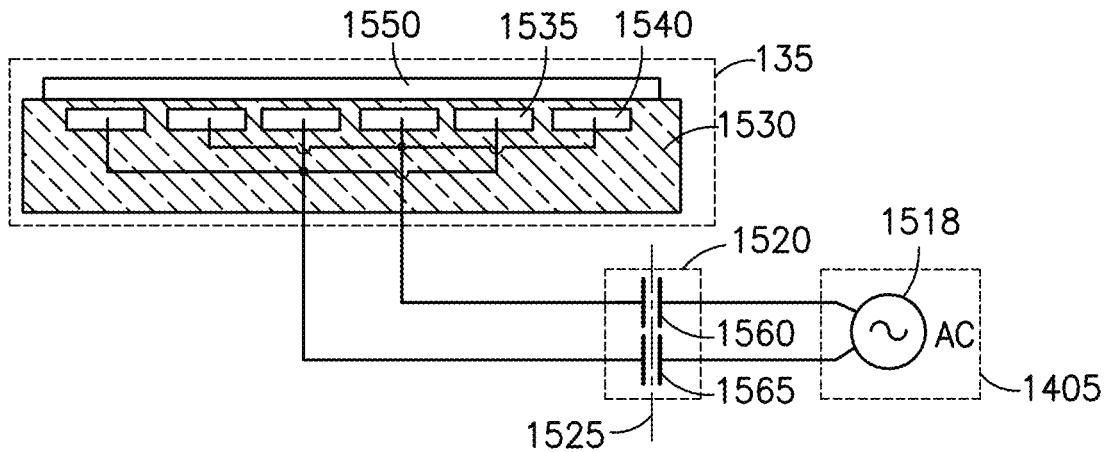

In another example embodiment as shown in FIG. 15B, the configuration may be substantially the same as the example embodiment described above with respect to FIG. 15A except for the electrical coupling 1520.

In the example embodiment of FIG. 15B, the electrical coupling 1520 may operate on a capacitive principle. As an example, the electrical coupling 1520 may comprise two portions which may move, for example, rotate, with respect to each other and which may feature opposing electrodes to form two channels 1560 and 1565. In this rotary configuration, the electrical coupling 1520 may be arranged in a radial configuration, as described earlier with respect to FIG. 10A. In this case, as shown in FIG. 10A, the electrical coupling 1520 may comprise an outer cylindrical portion and an inner cylindrical portion separated by a cylindrical gap. The opposing electrodes of the two portions may be in communication with each other via a radial electrical field across the cylindrical gap. Alternatively, the electrical coupling 1520 may be arranged in an axial configuration, as described earlier with respect to FIG. 10B. In this case, as shown in FIG. 10B, the electrical coupling 1520 may comprise an upper disk portion and a lower disk portion separated by a planar gap. The opposing electrodes of the two portions may be in communication with each other via an axial electrical field across the planar gap.

Figure 15C:
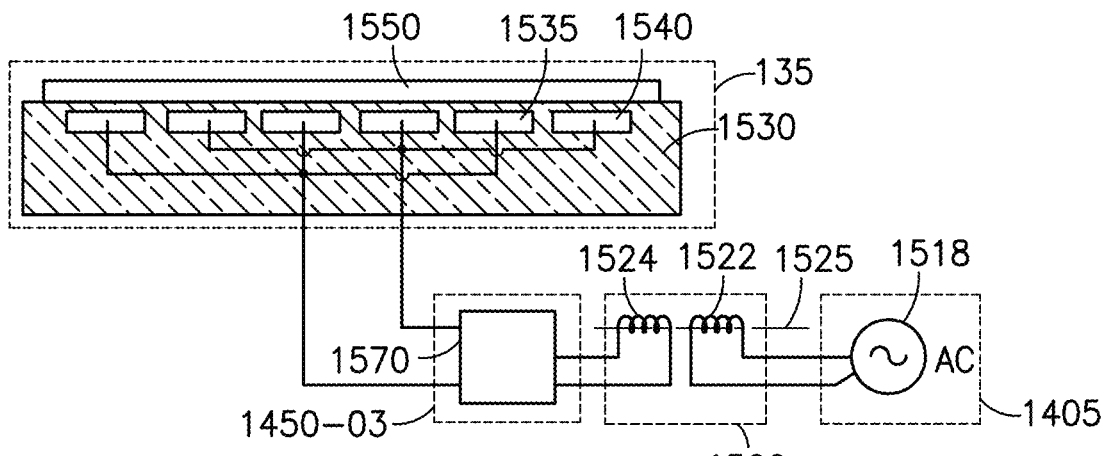

Referring now to FIG. 15C, the main electronic module 1405 may include AC source 1518. The main electronic module 1405 may also include optional circuitry, or its portion, to produce a control signal (or signals) for an auxiliary electronic module 1450-03, receive a status signal (or signals) from the auxiliary electronic module 1450-03 and/or to detect a payload 1550 and/or to assess the quality of grip. The main electronic module 1405 may be configured to accept power input and control signals. The power input may be utilized to power the AC source 1518 and other circuitry of the main electronic module 1405. The control signals may be used to activate, deactivate, modify, or otherwise control the AC source 1518. The voltage from the AC source 1518 may be channeled through the electrical coupling 1520 to the auxiliary electronic module 1450-03.

The electrical coupling 1520 as illustrated in FIG. 15C may operate on an inductive principle. It may be substantially the same as in the example embodiment described with respect to FIG. 15A. In addition, the electrical coupling 1520 may be configured to transmit additional signals, such as control and status signals, between the main electronic module 1405 and the auxiliary electronic module 1450-03. Additional coils (in addition to coils 1522, 1524) may be included for this purpose. Alternatively, a different means of communication between the main electronic module 1405 and the auxiliary electronic module 1450-03 may be used.

The auxiliary electronic module 1450-03 may include a rectifier 1570. The rectifier 1570 may be utilized to convert the AC voltage received through the electrical coupling 1520 to a DC voltage, which in turn may be supplied to the gripping 135. Auxiliary electronic module 1450-03 may also include circuitry to control the DC voltage, for example, to turn it on or off, based on a signal (or signals) received from the main electronic module 1405. Furthermore, the auxiliary electronic module 1450-03 may include circuitry, or a portion of such circuitry, to detect a payload 1550 and/or to assess the quality of grip, and/or to communicate status to the main electronic module 1405.

Referring now to FIG. 15C, the gripper 135 may comprise the dielectric (e.g., ceramic) foundation 1530 with one or more payload-facing surfaces and at least one electrode, such as electrodes 1535 and 1540, configured to produce an attractive force between the gripper 135 and the payload 1550 resting on the end-effector 130 of the robot 100 when the at least one electrode 1535, 1540 is energized, for instance, by applying a DC voltage from the auxiliary electronic module 1450-03. As an example, the application of a DC voltage to electrodes 1535, 1540 may create electric charge distributions on the electrodes and, in turn, these charge distributions may induce charges of opposite polarity on the payload 1550. The interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload and prevent slippage of the payload 1550 on the end-effector 130.

The operation of the example payload gripping system 1400 according to FIG. 15C can be summarized as follows: When the main electronic module 1405 applies AC voltage through electrical coupling 1520 to the auxiliary electronic module 1450-03, DC voltage may be applied to the gripper 135, and an attractive force between the payload 1550 and the gripper 135 may be produced. The attractive force may remain present as long as main module 1405 continues to apply the AC voltage.

Alternatively, the electronic module 1405 may apply AC voltage through the electrical coupling 1520 to the auxiliary electronic module 1450-03 continuously, and the auxiliary electronic module 1450-03 may control the DC voltage supplied to the gripper 135 based on a control signal (or control signals) received from the main electronic module 1405, thus controlling the attractive force between the payload 1550 and the gripper 135. The attractive force may remain present as long as the auxiliary electronic module 1450-03 continues to apply the DC voltage.

Figure 15D:
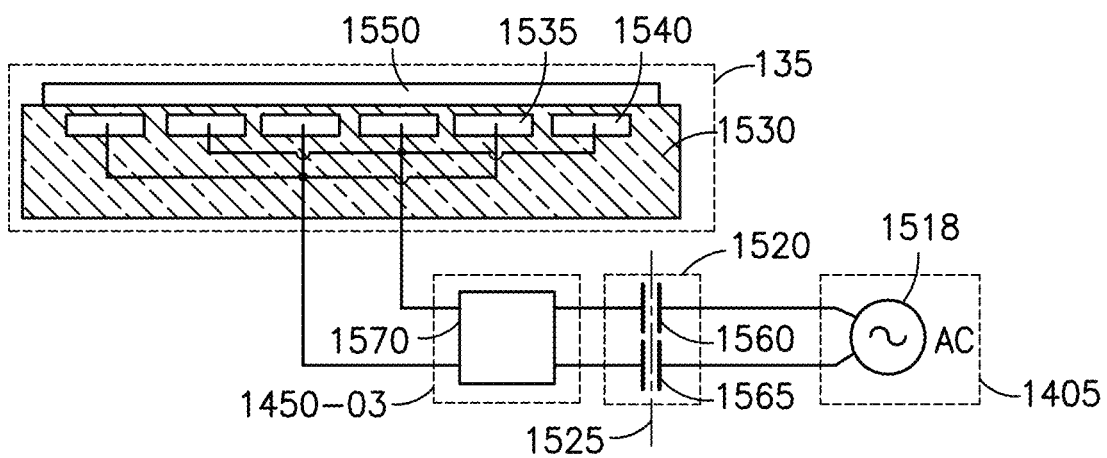

Another example embodiment, referring now to FIG. 15D, may be substantially the same as the example embodiment described above with respect to FIG. 15C except for the electrical coupling 1520.

As shown in FIG. 15D, the electrical coupling 1520 may operate on a capacitive principle. The operation of the electrical coupling 1520 may be substantially the same as described with respect to that of FIG. 15B. In addition, the electrical coupling 1520 may be configured to transmit additional signals, such as control and status signals, between the main electronic module 1405 and the auxiliary electronic module 1450-03. Additional electrodes may be included for this purpose. Alternatively, a different means of communication between the main electronic module 1405 and the auxiliary electronic module 1450-03 may be used.

The auxiliary electronic module 1450-03 may include the rectifier 1570. The rectifier 1570 may be utilized to convert the AC voltage received through the electrical coupling 1520 to a DC voltage, which in turn may be supplied to the gripper 135. The auxiliary electronic module 1450-03 may also include circuitry to control the DC voltage, for instance, to turn it on or off, based on a signal (or signals) received from the main electronic module 1405. Furthermore, the auxiliary electronic module 1450-03 may include circuitry, or a portion of such circuitry, to detect a payload and/or to assess the quality of grip, and/or to communicate status to the main electronic module 1405.

Figure 15E:
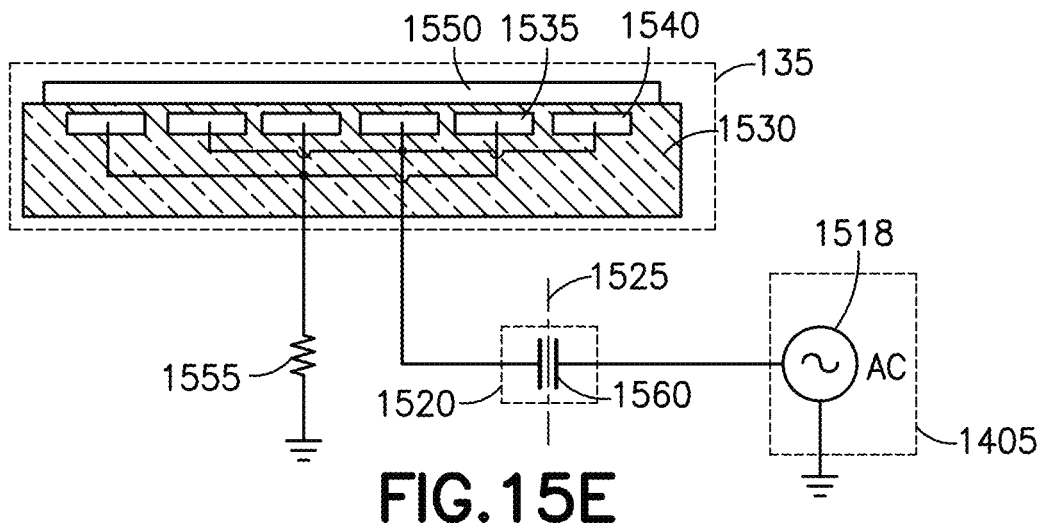

Referring now to FIG. 15E, in another example embodiment, the main electronic module 1405 may be substantially the same as described earlier with respect to FIG. 15A except that one output of the AC source 1518 may be connected to ground and the other output of the AC source 1518 may be routed through a single-channel capacitive electrical coupling 1520 to the gripper 135.

As depicted in FIG. 15E, the gripper 135 may comprise the dielectric (for example, ceramic) foundation 1530 with one or more payload-facing surfaces and at least one electrode, such as electrodes 1535 and 1540. As depicted in FIG. 15E, the electrode 1540 may be connected to the main electronic module 1405 through the electrical coupling 1520, and a finite resistance path to the ground 1555 may be provided to the other electrode 1535 to control its voltage with respect to ground.

Application of an AC voltage to the electrode 1540 may create electric charge distributions on the payload 1550, the electrode 1535, and the electrode 1540, and the interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload 1550 and prevent slippage of the payload 1550 on the end-effector 130.

The example payload gripping system 1400 according to FIG. 15E may be operated substantially in the same manner as described earlier with respect to FIG. 15A.

Figure 15F:
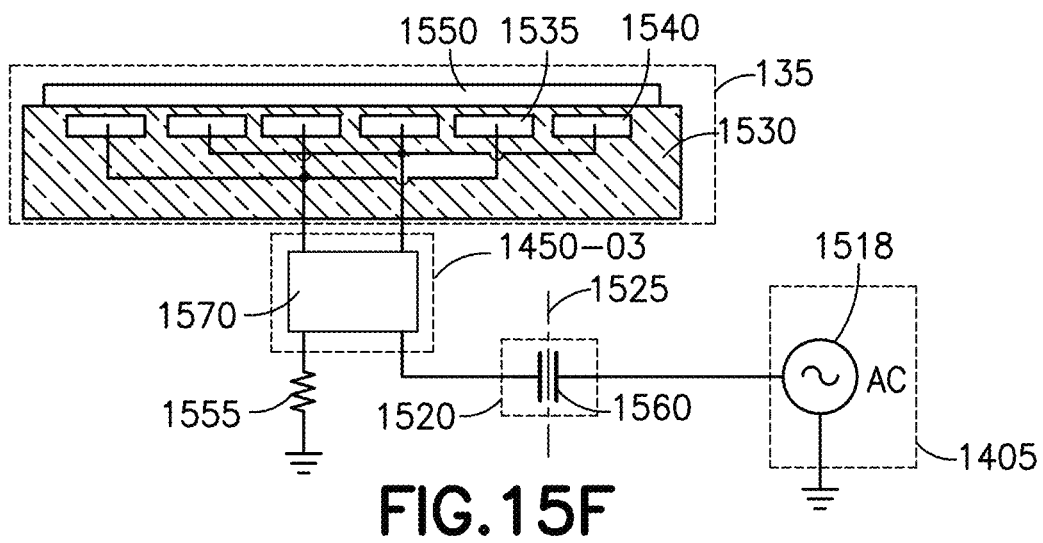

Referring now to FIG. 15F, in another example embodiment, the main electronic module 1405 and the electrical coupling 1520 may be substantially the same as described above with respect to FIG. 15E.

The auxiliary electronic module 1450-03 may be connected through the electrical coupling 1520 to the AC output of the main electronic module 1405. As shown in FIG. 15F, a finite resistance path to the ground 1555 may also be provided to the auxiliary electronic module 1450-03. The auxiliary module 1450-03 may include the rectifier 1570. The rectifier 1570 may be utilized to convert the AC voltage received through the electrical coupling 1520 to a DC voltage, which in turn may be supplied to the gripper 135.

The gripping module 135 of the example embodiment of FIG. 15F may be substantially the same as in the example embodiment described earlier with respect to FIG. 15A.

Figure 15G:
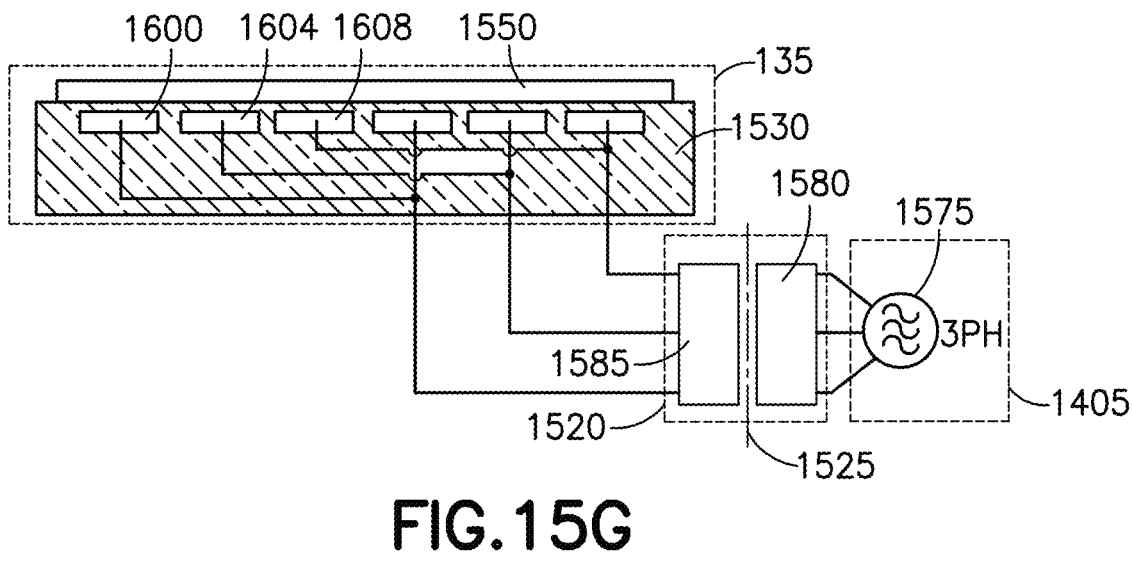

Referring now to FIG. 15G, in one example embodiment, the main electronic module 1405 may include a three-phase AC source 1575. The main electronic module 1405 may also include optional circuitry, or its portion, to detect a payload 1550 and/or to assess the quality of grip. The main electronic module 1405 may be configured to accept power input and control signals. The power input may be utilized to power AC source 1575 and other circuitry of the main electronic module 1405. The control signals may be used to activate, deactivate, modify, or otherwise control the AC source 1575. The voltage from the AC source 1575 may be channeled through the electrical coupling 1520 to the gripper 135.

The electrical coupling 1520 may operate on an inductive principle. As an example, the electrical coupling 1520 may comprise a plurality of inductively coupled coils, including primary coils 1580 and secondary coils 1585. Primary coils 1580 and secondary coils 1585 may be free to move with respect to each other, for example, they may rotate with respect to each other about the axis 1525. In such a rotary configuration, the primary coils 1580 and the secondary coils 1585 may be arranged in an axial arrangement, as described earlier with respect to FIG. 11, where the magnetic flux travels across a planar gap between the primary coils 1580 and the secondary coils 1585 in a direction substantially parallel to the axis of rotation. Alternatively, the primary coils 1580 and the secondary coils 1585 may be arranged in a radial arrangement, where the magnetic flux between the primary coils 1580 and the secondary coils 1585 travels radially across a cylindrical gap between the primary coils 1580 and the secondary coils 1585.

If desired, the primary coils 1580 and the secondary coils 1585 of the electrical coupling 1520 may be selected so that the electrical coupling 1520 may be utilized to step up the three-phase voltage provided by main the electronic module 1405.

Referring still to FIG. 15G, the gripper 135 may comprise the dielectric (for example, ceramic) foundation 1530 with one or more payload-facing surfaces and a plurality of electrodes, such as electrodes 1600, 1604, and 1608, configured to produce an attractive force between the gripper 135 and the payload 1550 resting on the end-effector 130 when at least some of the electrodes are energized, for instance, by applying an AC voltage received through the electrical coupling 1520 from the main electronic module 1405. As an example, the application of a three-phase AC voltage to electrodes 1600, 1604, and 1608 may create electric charge distributions on the electrodes and, in turn, these charge distributions may induce charges of opposite polarity on the payload 1550. The interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload 1550 and prevent slippage of the payload 1550 on the end-effector 130.

The operation of the example payload gripping system 1400 according to FIG. 15G can be summarized as follows: When main electronic module 1405 applies three-phase AC voltage through the electrical coupling 1520 to the gripper 135, an attractive force between the payload 1550 and the gripper 135 may be produced. The attractive force may remain present as long as the main electronic module 1405 continues to apply the three-phase AC voltage.

Although the example embodiment according to FIG. 15G is shown as a three-phase system, any suitable number of phases, including two phases, may be used.

Figure 15H:
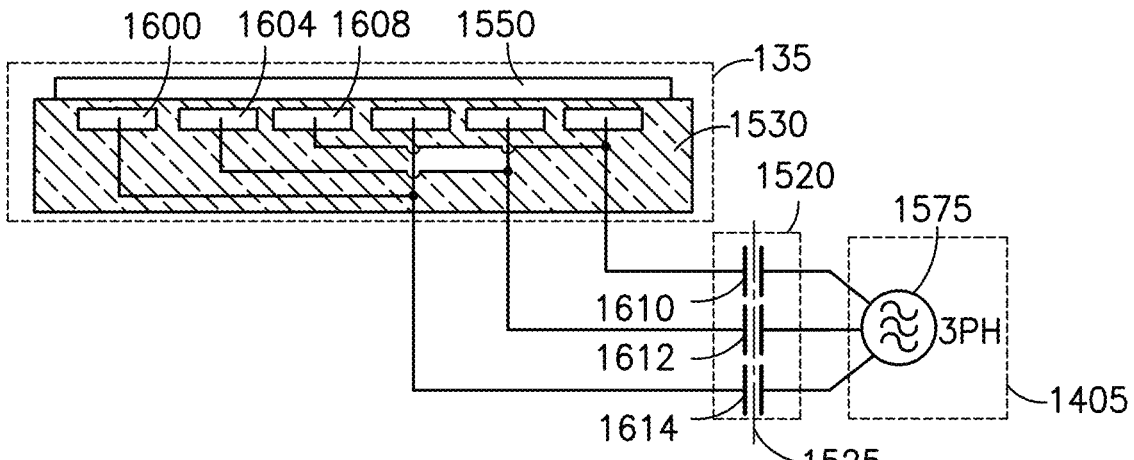

As shown in FIG. 15H, another example embodiment may be substantially the same as the example embodiment described above with respect to FIG. 15G except for the electrical coupling 1520.

In the example embodiment of FIG. 15H, the electrical coupling 1520 may operate on a capacitive principle. As an example, the electrical coupling 1520 may comprise two portions which may move, for example, rotate, with respect to each other and which may feature opposing electrodes to form channels 1610, 1612, and 1614. In a rotary configuration, the electrical coupling 1520 may be arranged in a radial configuration, similar to that shown in FIG. 10A. In this case, the electrical coupling 1520 may comprise an outer cylindrical portion and an inner cylindrical portion separated by a cylindrical gap. The opposing electrodes of the two portions may be in communication with each other via a radial electrical field across the cylindrical gap. Alternatively, the electrical coupling 1520 may be arranged in an axial configuration, similar to that shown in FIG. 10B. In this case, the electrical coupling 1520 may comprise an upper disk portion and a lower disk portion separated by a planar gap. The opposing electrodes of the two portions may be in communication with each other via an axial electrical field across the planar gap.

Although the example embodiment according to FIG. 15H is shown as a three-phase system, any suitable number of phases, including two phases, may be used.

Figure 15I:
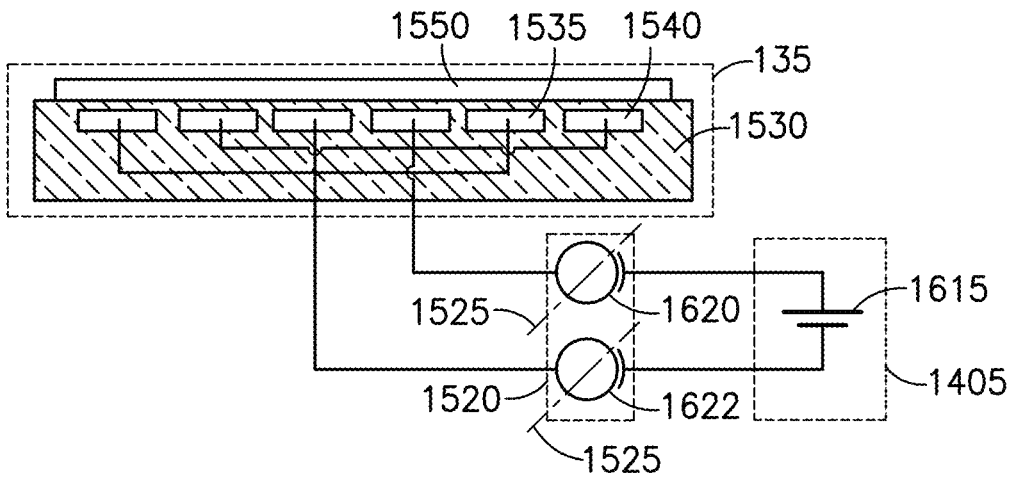

Referring now to FIG. 15I, in one example embodiment, the main electronic module 1405 may include a DC source 1615. The main electronic module 1405 may also include optional circuitry, or its portion, to detect a payload 1550 and/or to assess the quality of grip. The main electronic module 1405 may be configured to accept power input and control signals. The power input may be utilized to power DC source 1615 and other circuitry of the main electronic module 1405. The control signals may be used to activate, deactivate, modify, or otherwise control the DC source 1615. The voltage from the DC source 1615 may be channeled through the electrical coupling 1520 to the gripper 135.

As shown in FIG. 15I, the electrical coupling 1520 may be based on a two-channel slip-ring arrangement, such as channels 1620 and 1622. As an example, the slip-ring arrangement may be of an axial configuration. As another example, the slip ring arrangement may be of a radial configuration.

As depicted in FIG. 15I, the gripper 135 may comprise the dielectric (for example, ceramic) foundation 1530 with one or more payload-facing surfaces and at least one electrode, such as electrodes 1535 and 1540, configured to produce an attractive force between the gripper 135 and the payload 1550 resting on the end-effector 130 when the at least one electrode is energized, for instance, by applying a DC voltage received through the electrical coupling 1520 from the main electronic module 1405. As an example, the application of a DC voltage to the electrodes 1535 and 1540 may create electric charge distributions on the electrodes and, in turn, these charge distributions may induce charges of opposite polarity on the payload 1550. The interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload 1550 and prevent slippage of the payload 1550 on the end-effector 130.

The operation of the example payload gripping system 1400 according to FIG. 15I can be summarized as follows: When the main electronic module 1405 applies DC voltage through the electrical coupling 1520 to the gripper 135, an attractive force between the payload 1550 and the gripper 135 may be produced. The attractive force may remain present as long as the main module 1405 continues to apply the DC voltage.

Figure 15J:
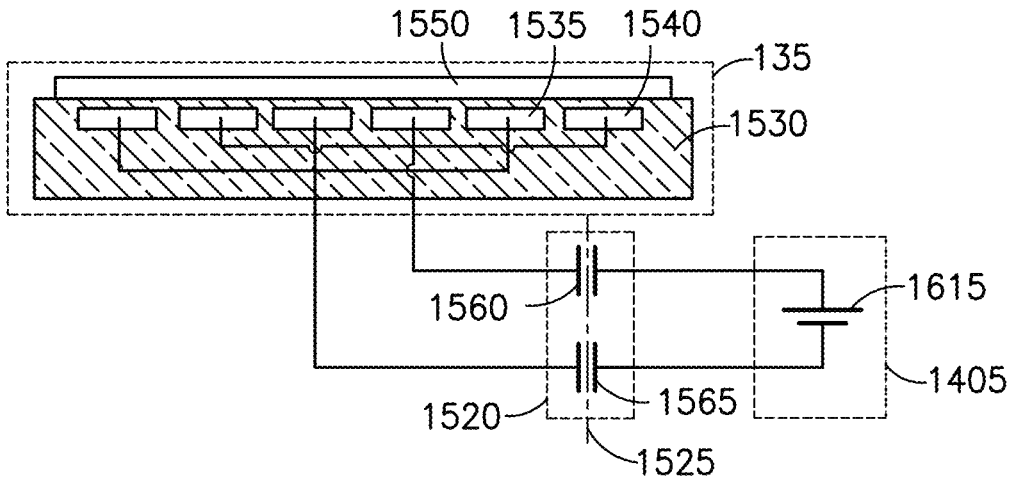

As shown in FIG. 15J, another example embodiment may be substantially the same as the example embodiment described above with respect to FIG. 15I except for the electrical coupling 1520.

In the example embodiment of FIG. 15J, the electrical coupling 1520 may operate on a capacitive principle. As an example, the electrical coupling 1520 may comprise two portions which may move, for example, rotate, with respect to each other and which may feature opposing electrodes to form two channels 1560 and 1565. In a rotary configuration, the electrical coupling 1520 may be arranged in a radial configuration, as described earlier with respect to FIG. 10A. In this case, as shown in FIG. 10A, the electrical coupling 1520 may comprise an outer cylindrical portion and an inner cylindrical portion separated by a cylindrical gap. The opposing electrodes of the two portions may be in communication with each other via a radial electrical field across the cylindrical gap. Alternatively, the electrical coupling 1520 may be arranged in an axial configuration, as described earlier with respect to FIG. 10B. In this case, as shown in FIG. 10B, the electrical coupling 1520 may comprise an upper disk portion and a lower disk portion separated by a planar gap. The opposing electrodes of the two portions may be in communication with each other via an axial electrical field across the planar gap. When DC voltage is applied to the electrodes connected to the main electronic module 1405, a change of electric charge distributions on the opposing electrodes may occur which, in turn, may create electric charge distributions on the electrodes 1535 and 1540 of the gripper 135.

Figure 15K:
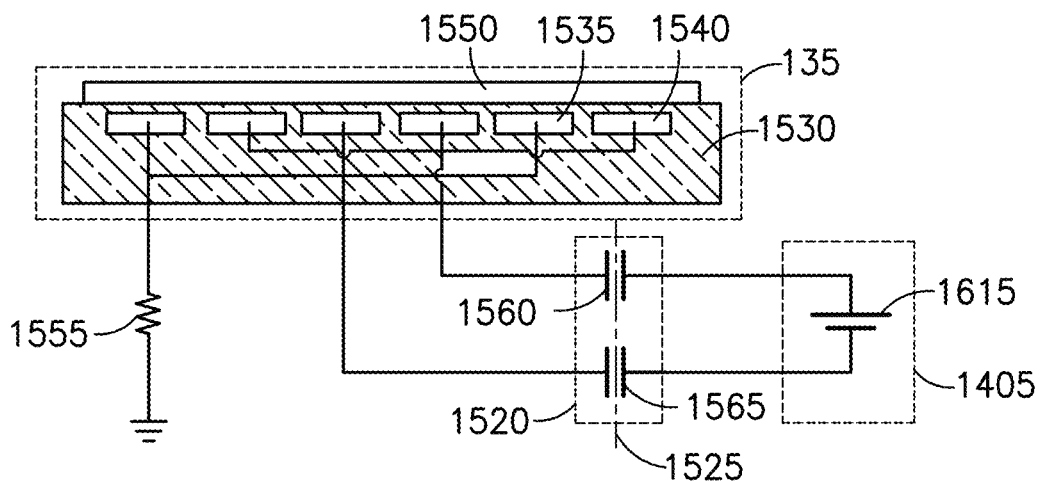

Another example embodiment, as shown in FIG. 15K, may be substantially the same as the example embodiment described above with respect to FIG. 15J except that a finite resistance path to the ground 1555 may be provided to one of the electrodes of the gripper 135, in the particular example electrode 1535 of FIG. 15K, to control the voltage with respect to ground.

Figure 15L:
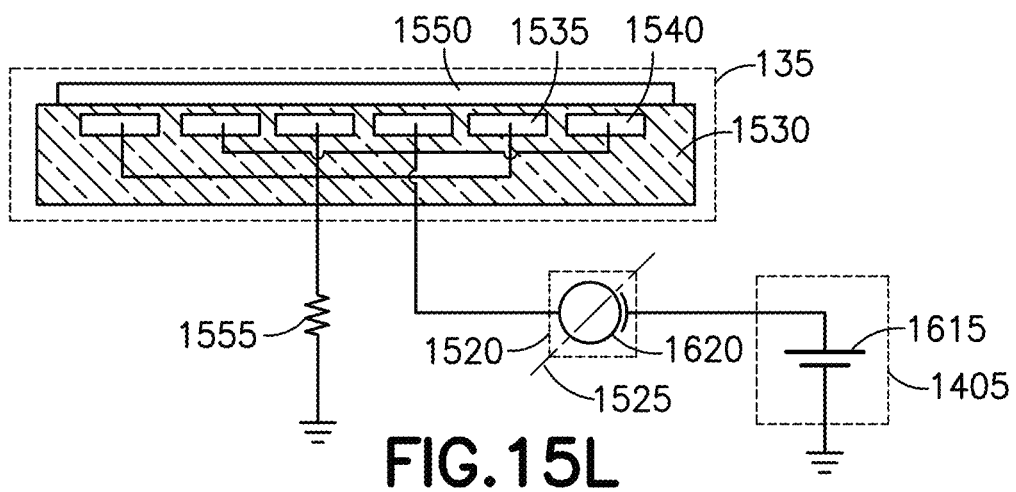

In another example embodiment, as shown in FIG. 15L, the main electronic module 1405 may be substantially the same as described earlier with respect to FIG. 15I except that one output of the DC source 1615 may be connected to ground and the other output of the DC source 1615 may be routed through a single-channel slip-ring-based electrical coupling 1520 to the gripper 135.

As shown in FIG. 15L, the gripper 135 may comprise the dielectric (for example, ceramic) foundation 1530 with one or more payload-facing surfaces and at least one electrode, such as electrodes 1535 and 1540. As depicted in FIG. 15L, the electrode 1540 may be connected to the main electronic module 1405 through the electrical coupling 1520, and a finite resistance path to the ground 1555 may be provided to the other electrode 1535 to control the voltage with respect to ground.

An application of a DC voltage to the electrode 1540 may create electric charge distributions on the payload 1550, the electrode 1535, and the electrode 1540, and the interaction of these charges may produce an attractive force between the payload 1550 and the dielectric foundation 1530. The attractive force may be utilized to increase the normal force between the payload 1550 and the end-effector 130, thus increasing the frictional force between the payload 1550 and the end-effector 130 available to hold the payload 155 and prevent slippage of the payload 1550 on the end-effector 130.

The example payload gripping system 1400 according to FIG. 15L may be operated substantially in the same manner as described earlier with respect to FIG. 15I.

Figure 15M:
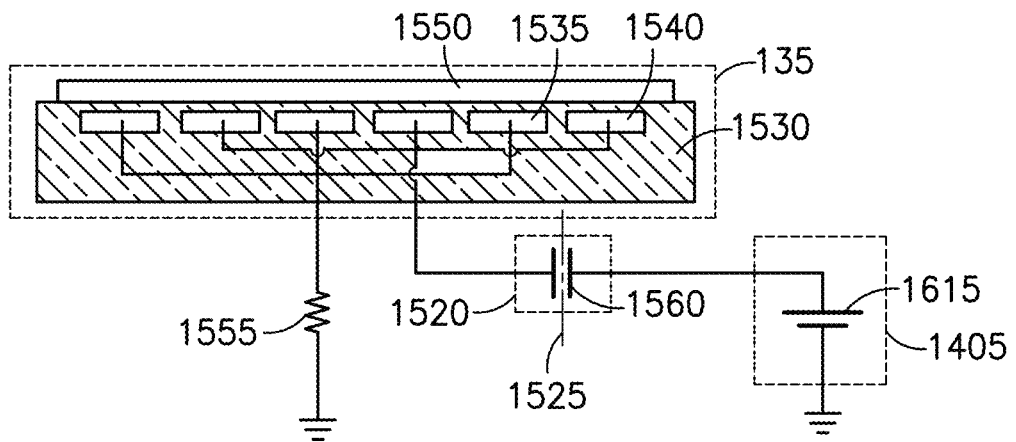

Another example embodiment, as shown in FIG. 15M, may be substantially the same as the example embodiment described above with respect to FIG. 15L except for the electrical coupling 1520.

In the example embodiment of FIG. 15M, the electrical coupling 1520 may operate on a capacitive principle. As an example, the electrical coupling 1520 may comprise two portions which may move, for example, rotate, with respect to each other and which may feature opposing electrodes to form a single channel 1560. In a rotary configuration, the electrical coupling 1520 may be arranged in a radial configuration, similar to that of FIG. 10A. In this case, the electrical coupling 1520 may comprise an outer cylindrical portion and an inner cylindrical portion separated by a cylindrical gap. The opposing electrodes of the two portions may be in communication with each other via a radial electrical field across the cylindrical gap. Alternatively, the electrical coupling 1520 may be arranged in an axial configuration, similar to that of FIG. 10B. In this case, the electrical coupling 1520 may comprise an upper disk portion and a lower disk portion separated by a planar gap. The opposing electrodes of the two portions may be in communication with each other via an axial electrical field across the planar gap. When DC voltage is applied to the electrode connected to the main electronic module 1405, a change of electric charge distribution on the opposing electrode may occur which, in turn, may create electric charge distribution on the electrode 1540 of the gripper 135.

Figure 16:
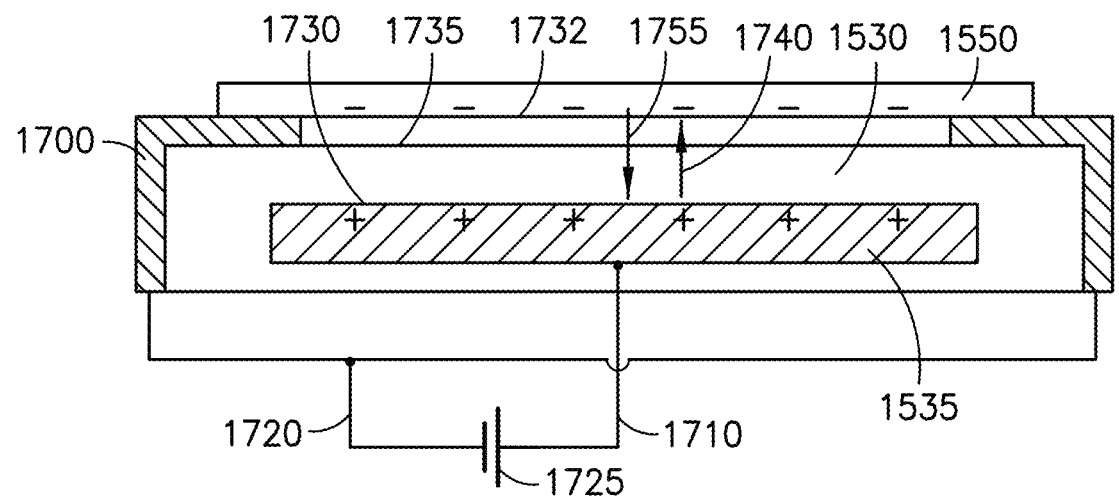
FIG. 16 is a schematic diagram of a unipolar configuration of an integrated payload gripper.

Various configurations of the gripper 135 may be used in the above embodiments. An example unipolar configuration of a gripper 135 with the payload 1550 is shown in FIG. 16. As shown in FIG. 16, the example unipolar gripper 135 may comprise the electrode 1535, which may be embedded inside the dielectric foundation 1530. The payload 1550, such as a semiconductor wafer, is shown to rest on the surface of a thin conductive layer 1700 which may cover the dielectric foundation 1530 completely or partially with a suitable pattern. To perform a gripping operation, an electrical potential difference may be applied between the electrode 1535 and the payload 1550 using conductors 1710 and 1720. The example of FIG. 16 shows the use of a DC power supply 1725 for this purpose. Application of an electrical potential difference may induce substantially equal and opposite charges in a top layer 1730 of the electrode 1535 and a bottom layer 1732 of the payload 1550, generating a resultant electric field 1740. The resultant electric field acts on the charge particles at a surface of the top layer 1730 and a surface 1738 of the bottom layer 1732 of the payload 1550, causing an attractive gripping force 1755.

Figure 17:
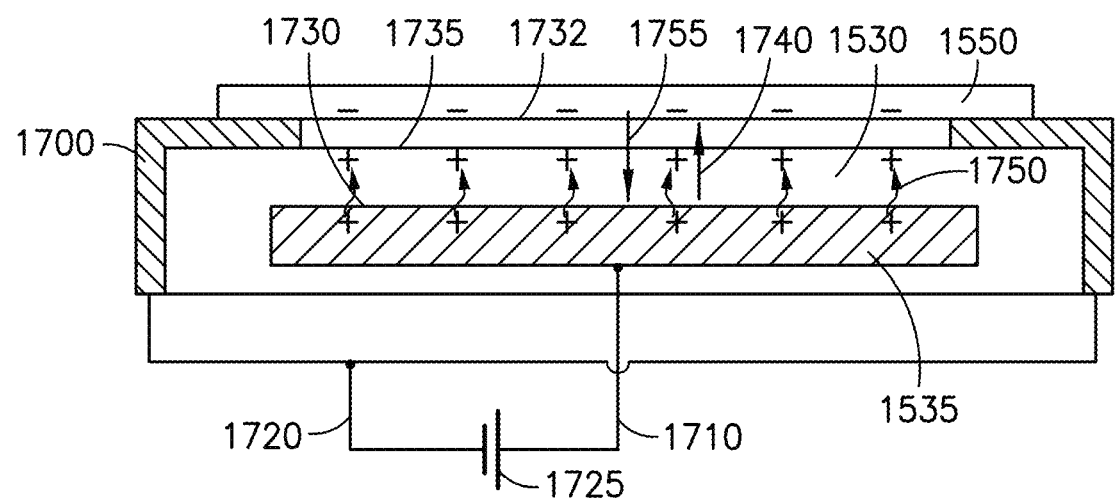
FIG. 17 is a schematic diagram of the integrated payload gripper of claim 16 using a low resistivity material.

The magnitude of the gripping force 1755 can be increased by using a low resistivity material to construct the dielectric foundation 1530. As illustrated in FIG. 17, a low resistivity dielectric material may allow for charge migration 1750 from the top layer 1730 of the electrode 1535 to a surface 1735 of the dielectric foundation 1530. The smaller gap between the surface 1735 and the surface 1738 at the bottom of the payload 1550 with equal and opposite induced charges may result in a stronger electric field 1740 and a stronger gripping force 1755 acting between the payload 1550 and the dielectric foundation 1530.

Payload release may be attained by cutting off the supply voltage. When supply voltage is cutoff, surface charges decay predominantly based on the RC time constant of the equivalent electric circuit. The structural parameters, such as the dielectric material, thickness of the dielectric material, and area of the electrode(s), can be chosen based on design requirements to minimize the payload release time by preventing residual charge accumulation when supply voltage is cut off.

Alternatively, DC power supply 1725 in the examples of FIG. 16 and FIG. 17 can be replaced by an AC power supply. This may provide additional options for contactless power transmission, such as power transmission based on an inductive principle, and improve payload release time. However, AC power may make the gripper 135 susceptible to vibrations as the gripping voltage may go to zero twice during each AC cycle.

As another example, the gripper 135 may be of a multielectrode configuration. A multielectrode gripper may comprise a single pair or multiple pairs of electrodes, where application of potential at the electrodes may induce reverse polarity charges on the payload 1550. A multielectrode gripper or gripping module may be advantageous over a unipolar gripper or gripping module, which may require active contact to be maintained to the payload 1550 and may result in non-zero net charge on the payload surface.

Figure 18:
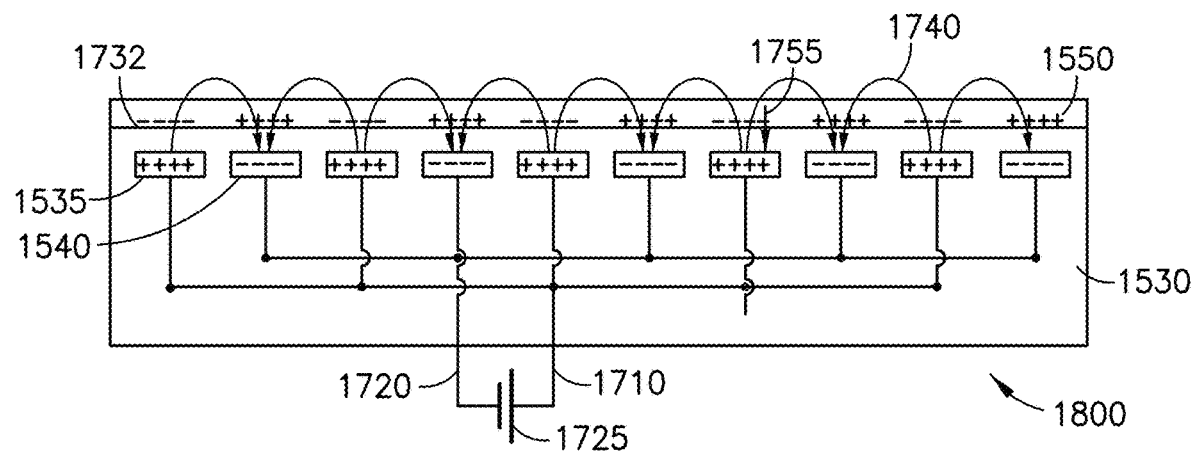
FIG. 18 is a schematic diagram of a bipolar configuration of an integrated payload gripper.

Referring now to FIG. 18, a bipolar configuration of a gripper or gripping module with the payload 1550 is shown generally at 1800 and is hereinafter referred to as "gripper 1800." The gripper 1800 may comprise two electrodes 1535 and 1540 embedded inside a dielectric foundation 1530. The payload 1550, for example, a semiconductor wafer, may rest on the top surface 1732 of the dielectric foundation 1530. The electrodes 1535 and 1540 may be arranged in an interleaving or interdigitated manner inside the dielectric foundation 1530 such that they have substantially identical surface areas exposed to the top surface 1732 of the dielectric foundation 1530.

To perform a gripping operation, an electrical potential difference may be applied between the electrodes 1535 and 1540 using the conductors 1710 and 1720. The example of FIG. 18 shows the use of DC power supply 1725 for this purpose. Energizing the electrodes may result in the electric field 1740 and may induce substantially equal and opposite charges on the lower surface of the substrate. The electric field 1740 may act on the induced charge particles to generate an attractive gripping force between the payload 1550 and the gripper 1800.

Alternatively, an AC power source can be used instead of the DC power supply 1725 shown in FIG. 18. Due to the periodic nature of the AC voltage, the generated gripping force may exhibit periodic variation, crossing zero twice during each cycle. The zero value of gripping force corresponds to the instant when the AC waveform goes to zero potential. The impact of the periodic variation of the gripping force can be reduced to some extent by utilizing a square-waveform-based AC power source.

Figure 19:
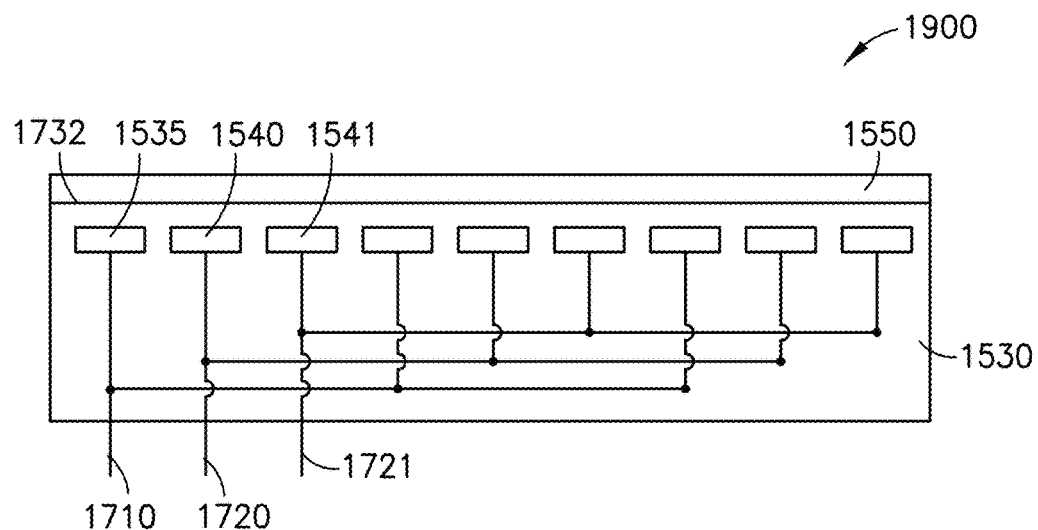
FIG. 19 is a schematic diagram of a payload gripper employing a three-phase system with phase offset.

As another alternative, multiphase AC power, for example, a three-phase system with 120-degree phase offset between individual phases, can be used to prevent the gripping force from dropping to zero. FIG. 19 shows an example of such a configuration of a gripper 1900 (or gripping module) with the payload 1550. The gripper 1900 may have three electrodes 1535, 1540, and 1541 embedded in a dielectric foundation 1530. The electrodes 1535, 1540, and 1541 may be energized via conductors 1710, 1720, and 1721, which may be fed by three distinct AC lines with a phase offset of 120 degrees between the phases. The use of a three-phase power to generate the gripping force may substantially eliminate the vibration caused by the gripping force dropping to zero twice in a cycle when using a single-phase AC source. Payload release can be attained by turning off the three-phase power.

Figure 20A:
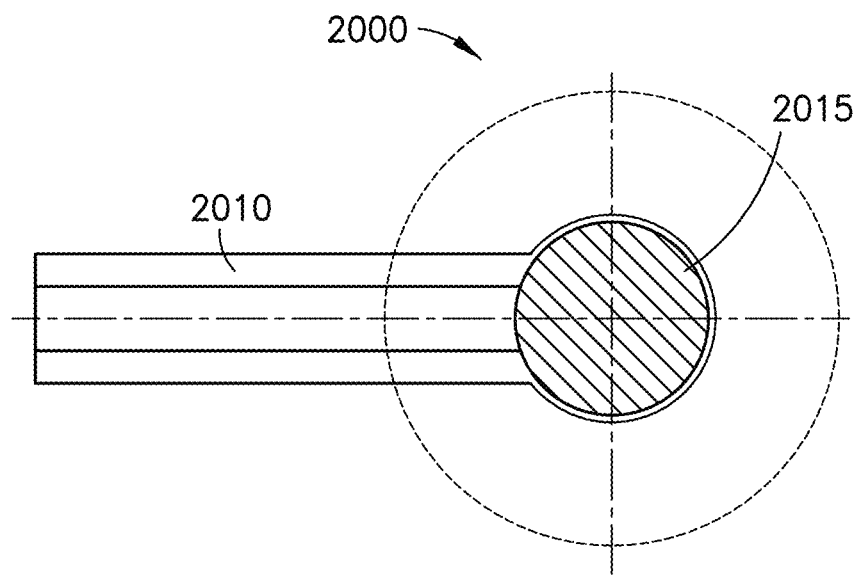
FIGS. 20A and 20B are schematic diagrams of end-effectors having integrated payload grippers.
Figure 20B:
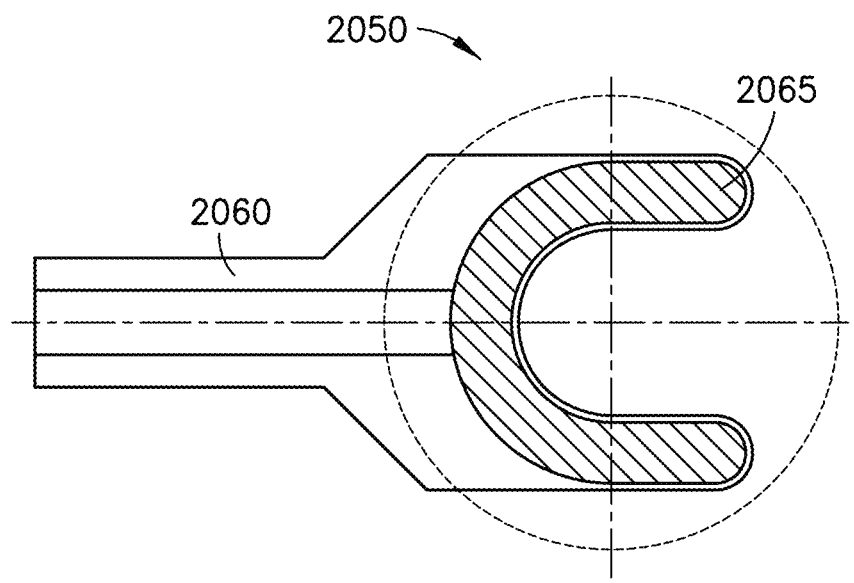

As indicated in FIGS. 3, 4, 5, and 7A, the gripper may be a separate assembly attached to the corresponding end-effector of the corresponding robot. Alternatively, the gripper may be fully or partially integrated into the end-effector. Two examples of an end-effector with an integrated gripper or gripping module are shown at 2000 and 2050 in FIGS. 20A and 20B, respectively. In the example of FIG. 20A, a dielectric foundation 2010 is shown as having a rounded end on which a round electrode pattern 2015 is mounted to operate as the gripping surface. In the example of FIG. 20B, a dielectric foundation 2060 is shown as having a forked end on which a forked or U-shaped electrode pattern 2065 is mounted to operate as the gripping surface. In either gripping module (2000 or 2050), the gripping surface is combined with the structure of the end-effector, forming a single assembly.

Figure 21A:
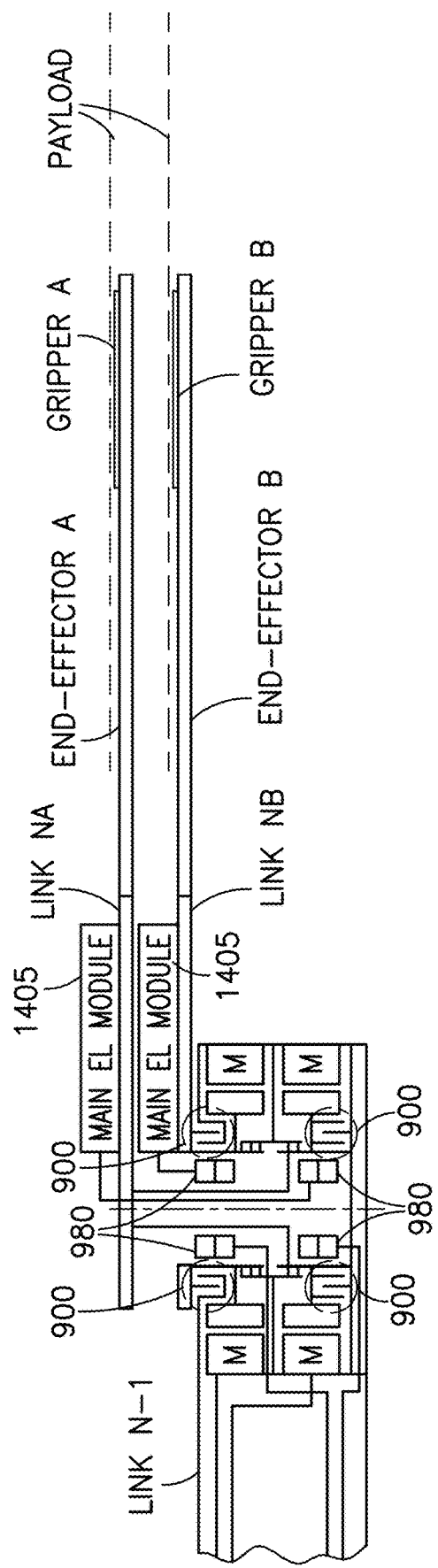
FIGS. 21A, 21B, and 21C are schematic diagrams of embodiments in which a main electronic module is connected directly to a payload gripper.
Figure 21B:
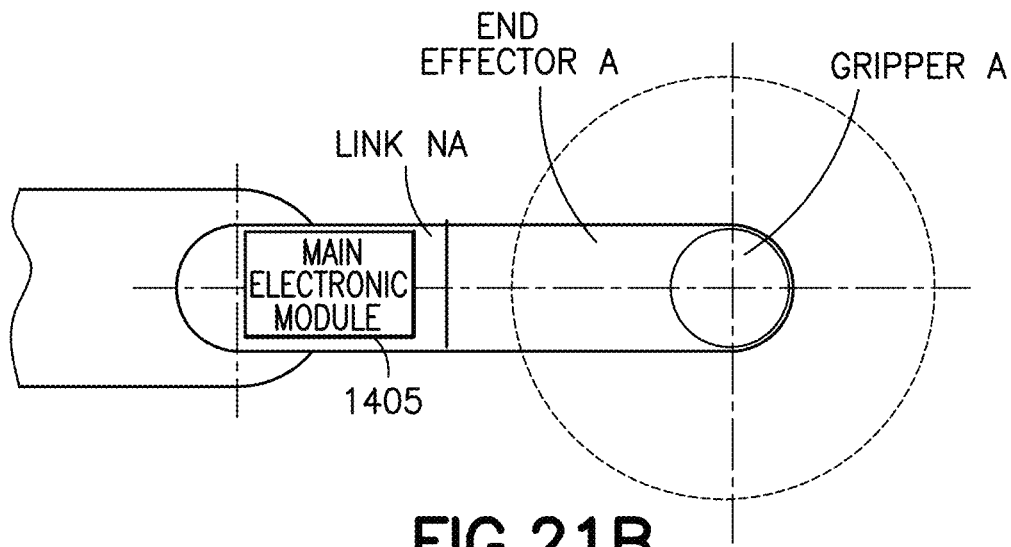
Figure 21C:
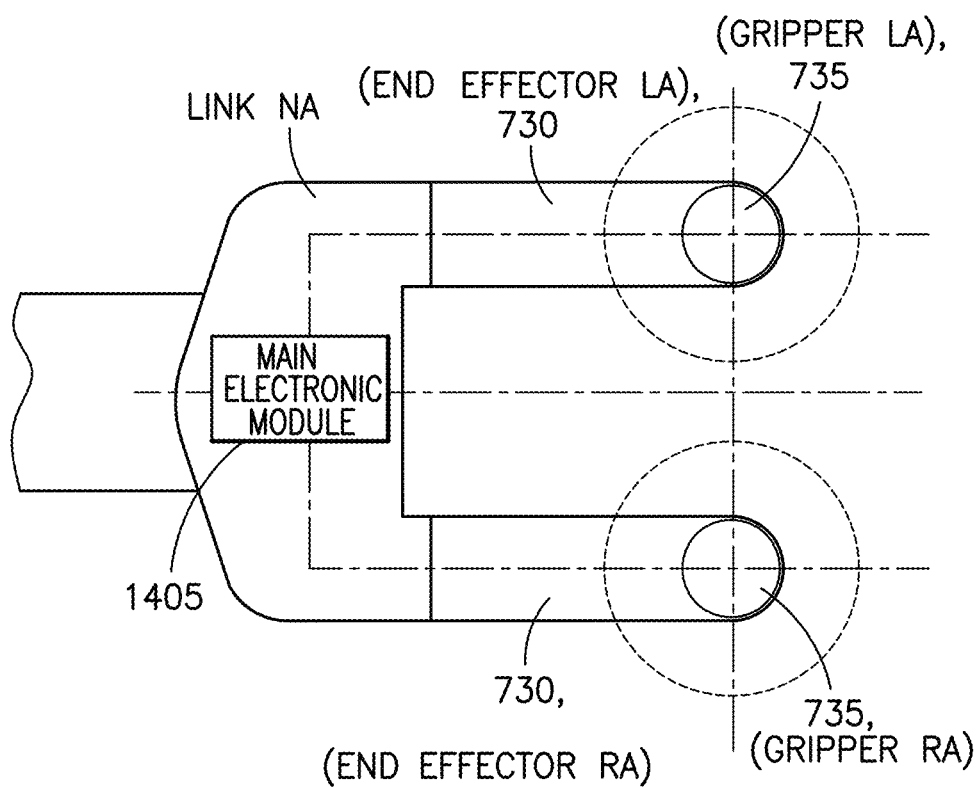

Although FIGS. 3, 4, 5, and 7A show one or more moving joints between a single main electronic module 1405 and each gripping module of the payload gripping system, FIGS. 21A, 21B, and 21C schematically show the main electronic module 1405 connected directly to one or more grippers or gripping modules. Furthermore, multiple main electronic modules may be utilized, one for each gripping module or a set of gripping modules as also depicted in FIGS. 21A, 21B, and 21C.

Figure 22:
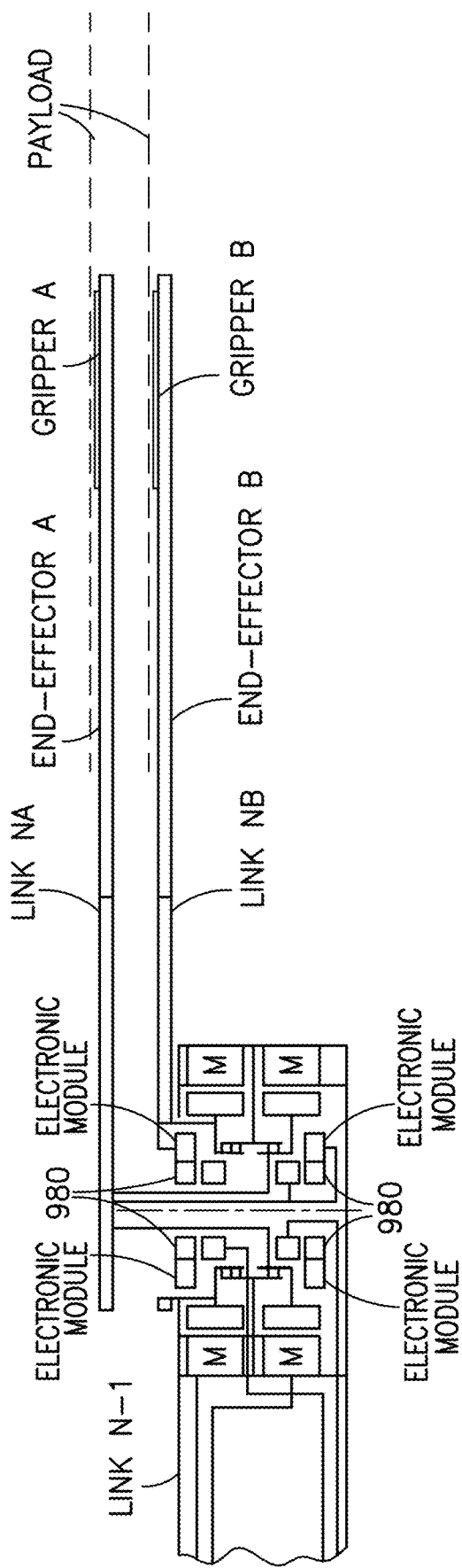
FIG. 22 is a schematic cross-sectional view showing internal arrangements of a robot in which an auxiliary electronic module is integrated into a rotary coupling.

In the examples of FIGS. 3, 4, 5, and 7A, the optional auxiliary module 990 of the payload gripping system 1400 is shown attached to the top of the corresponding link. This is just for illustrative purposes and clarity of depiction. The optional auxiliary electronic module 990 may be installed in any suitable location. For instance, it may be recessed or otherwise packaged into the corresponding joint. As an example, it may be integrated into the corresponding rotary coupling, as shown schematically in FIG. 22. Similarly, the main electronic module 1405 in the example of FIG. 21 may also be recessed or packaged into the corresponding joint.

In one example embodiment, an apparatus comprises a drive; a movable arm connected to the drive, the movable arm comprising a first link rotatable about the drive at a first rotary joint, a first actuator configured to cause a rotation of the at least one first link about the first rotary joint, at least one second link connected to the first link at a second rotary joint, at least one second actuator configured to cause a rotation of the at least one second link about the second rotary joint, and at least one gripper on the at least one second link, the at least one gripper being configured to carry a payload. The at least one gripper comprises a dielectric substrate, at least one electrode disposed on the dielectric substrate, the at least one electrode being configured to produce an attractive force on a surface of the electrode to attract the payload, and a main electronic module configured to apply a voltage to the at least one electrode from a source of current.

The source of current may comprise an alternating current. The apparatus may further comprise an electrical coupling between the source of current and the at least one electrode. The electrical coupling may comprise a pair of inductively coupled coils. The electrical coupling may comprise a capacitor having an outer cylindrical electrode annularly arranged and rotatable relative to an inner cylindrical electrode, the outer cylindrical electrode and the inner cylindrical electrode being separated by a gap. The electrical coupling may comprise a capacitor having a first disk and a second disk arranged in an axial configuration, the first disk and the second disk being separated by a gap. The electrical coupling may step up a voltage across the at least one electrode. The main electronic module may comprise circuitry configured to produce a control signal to the at least one electrode and/or to receive a status signal from the at least one electrode. The circuitry may comprise a rectifier to convert an alternating current to a direct current. The source of current may be a direct current, and the electrical coupling may comprise a slip-ring arrangement. The direct current may be connected to ground. The at least one electrode may be embedded into a material of the dielectric substrate. The at least one gripper may operate on an electrostatic discharge principle.

In another example embodiment, a method comprises providing a drive; providing a movable arm connected to the drive, the movable arm comprising a first link rotatable about the drive at a first rotary joint, a first actuator configured to cause a rotation of the at least one first link about the first rotary joint, at least one second link connected to the first link at a second rotary joint, at least one second actuator configured to cause a rotation of the at least one second link about the second rotary joint, and at least one gripper on the at least one second link, the at least one gripper comprising a dielectric substrate and at least one electrode disposed on the dielectric substrate; and applying a voltage to the at least one electrode, from a source of current, to produce an attractive force on the surface of the electrode to cause an attractive force between the at least one electrode and a payload adjacent to the electrode and to be carried by the at least one gripper.

The source of current may comprise an alternating current. The method may further comprise rectifying the alternating current to a direct current. The method may further comprise providing an electrical coupling between the source of current and the at least one electrode. The method may comprise inductively coupling the source of current and the at least one electrode using the electrical coupling. The method may further comprise stepping up a voltage across the at least one electrode using the inductive electrical coupling. The method may comprise capacitively coupling the source of current and the at least one electrode using the electrical coupling. Applying the current to the at least one electrode may comprise applying a direct current. The at least one gripper may operate by electrostatic discharge to cause and release the attractive force between the at least one electrode and the payload.

In another example embodiment, an apparatus comprises at least one processor; and at least one non-transitory memory including computer program code, the at least one memory and the computer program code configured to, with the at least one processor, cause the apparatus at least to perform applying a voltage to at least one electrode, from a source of current, to produce an attractive force on a surface of the electrode to cause an attraction between the at least one electrode and a surface of a payload adjacent to the electrode. The payload is configured to be carried by at least one gripper.

The source of current may comprise an alternating current. The apparatus may further be caused to perform rectifying the alternating current to a direct current. The source of current may be inductively coupled to the at least one electrode. The apparatus may further be caused to perform stepping up a voltage across the at least one electrode. The source of current may be capacitively coupled to the at least one electrode. The voltage may be applied by applying a direct current.

In another example embodiment, a method of using a robot to transport a payload comprises applying a voltage, from a source of current, to an electrode located on a gripper, the gripper being located on a robot end-effector, wherein applying the voltage causes a first distribution of charges on the electrode; placing the payload on the electrode; causing a second distribution of charges on the payload, wherein the charges on the payload are opposite in polarity to the charges on the electrode; attracting the payload to the gripper; and causing the robot end-effector to transport the payload.

Applying the voltage to the electrode may comprise applying the voltage from an alternating current. The method may further comprise rectifying the alternating current to a direct current. The method may further comprise inductively coupling the source of the current to the at least one electrode. The method may further comprise stepping up a voltage across the at least one electrode. The method may further comprise capacitively coupling the applied current to the at least one electrode. The method may further comprise releasing the payload. Releasing the payload may involve an electrostatic discharge of the first distribution of charges on the electrode and the second distribution of charges on the payload.

Although the present invention is described with respect to example robots with stationary drive units, it can be extended to robots with movable drive units, such as traversing drive units such as, for example, shown and described in U.S. Pat. Nos. 10,800,050; 10,742,070; 10,596,710; and 10,269,604, which are hereby incorporated by reference in their entireties, and U.S. Patent Publication Nos. 2020/0262660 A1 and 2018/0108552 A1, which are also hereby incorporated by reference in their entireties. Similarly, although the present invention is described with respect to robots with rotary joints, it can be extended to robots with other types of joints, such as prismatic (linear) joints (robots with linear arms).

Although most of the above example embodiments feature two independently actuated end-effectors, any number of end-effectors may be supported, including one independently actuated end-effector and three or more independently actuated end-effectors. Furthermore, the robot arm may carry one or more assemblies of multiple rigidly connected end-effectors. As an example, such an assembly of rigidly connected end-effectors may comprise a pair of end-effectors arranged side-by-side in a single plane, or it may comprise multiple end-effectors stacked substantially above each other.

Although a single z-axis mechanism is shown as part of the above example embodiments, any number of z-axis mechanisms, including zero z-axis mechanisms, may be used. Although the above example embodiments are depicted with a z-axis actuated by a rotary motor via a ball-screw, any other suitable arrangement, such as, without limitation, a linkage mechanism or a linear motor, may be used.

It should be noted that the bearings, bearing arrangements, and bearing locations shown in the Figures throughout the document are intended for illustration only—the purpose is to communicate how individual components may generally be constrained with respect to each other. Any suitable bearings, bearing arrangements, and bearing locations may be used.

Although a communication network is described as the means of communication between the various components of the control system, any other suitable means of communication between the master controller and the control modules, such as a wireless network or point-to-point bus, may be utilized.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications, and variances.

What is claimed is:

1. An apparatus, comprising:
a drive;
a movable arm connected to the drive, the movable arm comprising,
   a first link rotatable about the drive at a first rotary joint,
   a first actuator configured to cause a rotation of the first link about the first rotary joint,
   at least one second link connected to the first link at a second rotary joint,
   at least one second actuator configured to cause a rotation of the at least one second link about the second rotary joint, and
   at least one gripper on the at least one second link, the at least one gripper being configured to carry a payload, the at least one gripper comprising,
      a dielectric substrate,
      at least one electrode disposed on the dielectric substrate, the at least one electrode being configured to cause a charge migration from the at least one electrode to the dielectric substrate to produce an attractive force on a surface of the dielectric substrate to attract the payload,
      a main electronic module configured to apply a voltage to the at least one electrode from a source of current and to produce a control signal; and
      an auxiliary electronic module for receiving the control signal from the main electronic module, the auxiliary electronic module being configured to at least control the voltage to the at least one electrode to control the attractive force on the surface of the dielectric substrate and to further at least detect the payload, assess a quality of the at least one gripper on the payload, and communicate a status of the payload to the main electronic module.

2. The apparatus of claim 1, wherein the source of current comprises an alternating current.

3. The apparatus of claim 1, further comprising an electrical coupling between the source of current and the at least one electrode.

4. The apparatus of claim 3, wherein the electrical coupling comprises a pair of inductively coupled coils.

5. The apparatus of claim 3, wherein the electrical coupling comprises a capacitor having an outer cylindrical electrode annularly arranged and rotatable relative to an inner cylindrical electrode, the outer cylindrical electrode and the inner cylindrical electrode being separated by a gap.

6. The apparatus of claim 3, wherein the electrical coupling comprises a capacitor having a first disk and a second disk arranged in an axial configuration, the first disk and the second disk being separated by a gap.

7. The apparatus of claim 3, wherein the electrical coupling steps up a voltage across the at least one electrode.

8. The apparatus of claim 3, wherein the source of current is a direct current, and wherein the electrical coupling comprises a slip-ring arrangement.

9. The apparatus of claim 8, wherein the direct current is connected to ground.

10. The apparatus of claim 1, wherein the main electronic module comprises circuitry configured to produce the control signal to the at least one electrode or to receive a status signal communicating the status of the payload from the at least one electrode.

11. The apparatus of claim 10, wherein the circuitry comprises a rectifier to convert an alternating current to a direct current.

12. The apparatus of claim 1, wherein the at least one electrode is embedded into a material of the dielectric substrate.

13. The apparatus of claim 1, wherein the at least one gripper operates on an electrostatic discharge principle.

14. A method, comprising:
 providing a drive;
 providing a movable arm connected to the drive, the movable arm comprising,
  a first link rotatable about the drive at a first rotary joint,
  a first actuator configured to cause a rotation of the first link about the first rotary joint,
  at least one second link connected to the first link at a second rotary joint,
  at least one second actuator configured to cause a rotation of the at least one second link about the second rotary joint, and
  at least one gripper on the at least one second link, the at least one gripper comprising,
   a dielectric substrate, and
   at least one electrode disposed on the dielectric substrate;
 applying a voltage to the at least one electrode with a main electronic module, from a source of current, to cause a charge migration from the at least one electrode to the dielectric substrate to produce an attractive force on the surface of the dielectric substrate to cause an attractive force between the dielectric substrate and a payload adjacent to the dielectric substrate and to be carried by the at least one gripper and to produce a control signal; and
 controlling the voltage to the at least one electrode using an auxiliary electronic module to control the attractive force between the dielectric substrate and the payload; and
 controlling the produced control signal from the main electronic module to detect the payload, assess a quality of the at least one gripper on the payload, and communicate a status of the payload to the main electronic module.

15. The method of claim 14, wherein the source of current comprises an alternating current.

16. The method of claim 15, further comprising rectifying the alternating current to a direct current.

17. The method of claim 14, further comprising providing an electrical coupling between the source of current and the at least one electrode.

18. The method of claim 17, comprising inductively coupling the source of current and the at least one electrode using the electrical coupling.

19. The method of claim 18, further comprising stepping up a voltage across the at least one electrode using the electrical coupling.

20. The method of claim 17, comprising capacitively coupling the source of current and the at least one electrode using the electrical coupling.

21. The method of claim 14, wherein applying the current to the at least one electrode comprises applying a direct current.

22. The method of claim 14, wherein the at least one gripper operates by electrostatic discharge to cause and release the attractive force between the at least one electrode and the payload.

23. An apparatus, comprising:
 at least one processor; and
 at least one non-transitory memory including computer program code, the at least one memory and the computer program code configured to, with the at least one processor, cause the apparatus at least to perform:
  applying a voltage to at least one electrode with a first electronic module, from a source of current, to produce an attractive force on a surface of the electrode to cause a charge migration from the electrode to a low resistivity dielectric material of at least one gripper to cause an attraction between the low resistivity dielectric material and a surface of a payload adjacent to the low resistivity dielectric material, wherein the payload is configured to be carried by the at least one gripper, and to produce a control signal; and
  controlling the voltage to the at least one electrode using a second electronic module to control the attractive force on the surface of the electrode; and
  controlling the produced control signal from the first electronic module to detect the payload, assess a quality of the at least one gripper on the payload, and communicate a status of the payload to the first electronic module.

24. The apparatus of claim 23, wherein the source of current comprises an alternating current.

25. The apparatus of claim 24, wherein the apparatus is further caused to perform rectifying the alternating current to a direct current.

26. The apparatus of claim 23, wherein the source of current is inductively coupled to the at least one electrode.

27. The apparatus of claim 26, wherein the apparatus is further caused to perform stepping up a voltage across the at least one electrode.

28. The apparatus of claim 23, wherein the source of current is capacitively coupled to the at least one electrode.

29. The apparatus of claim 23, wherein the voltage is applied by applying a direct current.

30. A method of using a robot to transport a payload, the method comprising:
 applying a voltage, from a source of current and using a main electronic module, to an electrode located within a gripper, the gripper being located on a robot end-effector, wherein applying the voltage causes a first distribution of charges on the electrode to cause a charge migration from the electrode to a material of the gripper;
 placing the payload on the material of the gripper;
 causing a second distribution of charges on the payload, wherein the charges on the payload are opposite in polarity to the charges on the material of the gripper;
 attracting the payload to the material of the gripper;
 causing the robot end-effector to transport the payload; and
 controlling the voltage to the electrode located within the gripper using an auxiliary electronic module to control the charge migration from the electrode to the material of the gripper; and
 controlling a signal from the main electronic module to detect a payload, assess a quality of the gripper on the payload, and communicate a status of the payload to the main electronic module.

31. The method of claim 30, wherein applying the voltage to the electrode comprises applying the voltage from an alternating current.

32. The method of claim 31, further comprising rectifying the alternating current to a direct current.

33. The method of claim 30, further comprising inductively coupling the source of the current to the electrode.

34. The method of claim 33, further comprising stepping up a voltage across the electrode.

35. The method of claim 30, further comprising capacitively coupling the applied current to the electrode.

36. The method of claim 30, further comprising releasing the payload.

37. The method of claim 36, wherein releasing the payload involves an electrostatic discharge of the first distribution of charges on the electrode and the second distribution of charges on the payload.

* * * * *